United States Patent
Torsner et al.

(10) Patent No.: US 10,484,882 B2
(45) Date of Patent: Nov. 19, 2019

(54) RADIO RESOURCE MANAGEMENT IN WIRELESS COMMUNICATION SYSTEMS

(71) Applicant: Telefonaktiebolaget LM Ericsson (publ), Stockholm (SE)

(72) Inventors: Johan Torsner, Kyrkslätt (FI); Jani-Pekka Kainulainen, Kirkkonummi (FI); Anna Larmo, Espoo (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

(21) Appl. No.: 15/760,747

(22) PCT Filed: Nov. 22, 2017

(86) PCT No.: PCT/SE2017/051152
§ 371 (c)(1),
(2) Date: Mar. 16, 2018

(87) PCT Pub. No.: WO2019/103664
PCT Pub. Date: May 31, 2019

(65) Prior Publication Data
US 2019/0261193 A1    Aug. 22, 2019

(51) Int. Cl.
*H04W 16/22* (2009.01)
*H04W 16/28* (2009.01)
(Continued)

(52) U.S. Cl.
CPC .............. *H04W 16/22* (2013.01); *G06T 7/20* (2013.01); *G06T 17/05* (2013.01); *H04W 16/28* (2013.01);
(Continued)

(58) Field of Classification Search
CPC ..... H04W 16/22; H04W 16/28; H04W 24/10; G06T 7/20; G06T 17/05; G06T 2207/10032; G06T 2207/30232
See application file for complete search history.

(56) References Cited

U.S. PATENT DOCUMENTS

2016/0150435 A1\* 5/2016 Baek .................... H04W 16/28
370/252
2017/0265111 A1   9/2017 Fan et al.
(Continued)

FOREIGN PATENT DOCUMENTS

WO    2009038362 A2    3/2009
WO    2016198124 A1   12/2016

OTHER PUBLICATIONS

Oguma, Yuta et al., "Proactive Base Station Selection Based on Human Blockage Prediction Using RGB-D Cameras for mmWave Communications", 2015 IEEE Global Communications Conference (GLOBECOM), Dec. 16, 2015, 1-6.
(Continued)

*Primary Examiner* — Hassan Kizou
*Assistant Examiner* — Deepa Belur
(74) *Attorney, Agent, or Firm* — Murphy, Bilak & Homiller, PLLC

(57) ABSTRACT

The proposed technology generally relates to radio resource management in wireless communication systems, which operate based on directive beams for serving one or more wireless user devices (120). A basic idea is to process image information obtained from one or more image sensors (115) to predict a change in radio propagation characteristics between a network node (110) of the wireless communication system and a user device (120), and to control a mobility reference signal for at least one directive beam in the wireless communication system and/or configure measurements of the mobility reference signal and/or configure (Continued)

reporting and/or processing of measurement results from measurements of the mobility reference signal, based on the predicted change in radio propagation characteristics.

28 Claims, 25 Drawing Sheets

(51) Int. Cl.
  *H04W 24/10* (2009.01)
  *G06T 17/05* (2011.01)
  *G06T 7/20* (2017.01)
(52) U.S. Cl.
  CPC ... *H04W 24/10* (2013.01); *G06T 2207/10032* (2013.01); *G06T 2207/30232* (2013.01)

(56) References Cited

U.S. PATENT DOCUMENTS

| | | | |
|---|---|---|---|
| 2017/0265112 A1 | 9/2017 | Morita et al. | |
| 2017/0302355 A1* | 10/2017 | Islam | H04B 7/0639 |
| 2018/0092094 A1* | 3/2018 | Ly | H04L 5/0055 |
| 2018/0138962 A1* | 5/2018 | Islam | H04L 5/0048 |
| 2018/0139712 A1* | 5/2018 | Abedini | H04L 27/2657 |
| 2018/0234960 A1* | 8/2018 | Nagaraja | H04B 17/318 |
| 2018/0249526 A1* | 8/2018 | Nagaraja | H04W 24/08 |
| 2018/0287687 A1* | 10/2018 | Wu | H04W 52/02 |
| 2019/0028253 A1* | 1/2019 | Ahn | H04L 1/0061 |

OTHER PUBLICATIONS

Oguma, Yuta, et al., "Performance Modeling of Camera-assisted Proactive Base Station Selection for Human Blockage Problem in mmWave Communications", IEEE Wireless Communications and Networking Conference (WCNC 2016), Track 3—Mobile and Wireless Networks, Apr. 3, 2016, pp. 1-7.

* cited by examiner i) Controlling MRS
ii) Configuring MRS measurements
iii) Configuring measurement processing

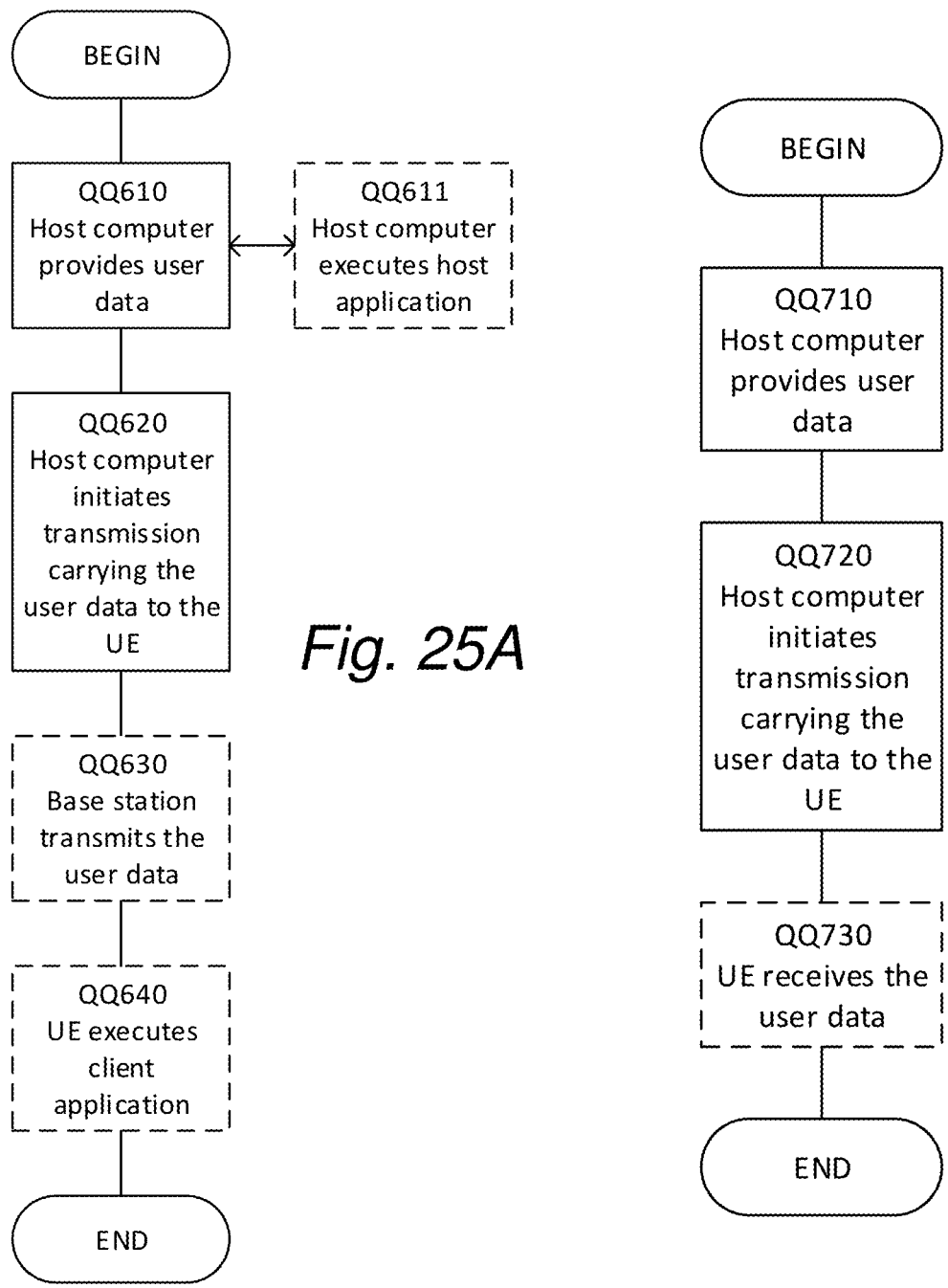

RADIO RESOURCE MANAGEMENT IN WIRELESS COMMUNICATION SYSTEMS

TECHNICAL FIELD

The proposed technology generally relates to radio resource management in wireless communication systems, and more particularly to a method and system for performing radio resource management in a wireless communication system, a radio resource management controller and corresponding network units, as well as a corresponding computer program and computer-program product and an apparatus for performing radio resource management in a wireless communication system.

BACKGROUND

In general, Radio Resource Management (RRM) is very important in wireless communication systems.

RRM is at the heart of any advanced wireless system and determines how the radio resources are utilized. For example, which radio channel, transmission power, transmission mode, modulation and coding that should be used and which base station/access point the user should be connected to.

The RRM solution to a large extent determines the performance of the wireless network.

Modern wireless communication systems, such as IEEE 802.11ay and 3GPP 5G, also referred to as New Radio (NR), operating on high frequencies are dependent on advanced antenna solutions with beam forming and beam tracking which is also part of RRM.

Such systems will use advanced antenna systems containing large antenna arrays for data transmission. With large antenna arrays, data signals will be transmitted in narrow beams to increase signal strength in some directions, and/or to reduce interference in other directions. On one hand, this is done to obtain improved link quality and to enable spatial separation and reduce interference between users. On the other hand, using arrays is necessary to ensure sufficient link quality in high-frequency deployments where the individual antenna element apertures are small and do not capture sufficient signal energy individually. By coherently aligning the elements, gives rise to effective beam gain, but also beam directivity in a certain direction.

FIG. 1 is a schematic diagram illustrating an example of a wireless communication system operating using directive beams for serving wireless user devices. The wireless communication system 100 may be based on a radio access part including network nodes 110 such as radio access network nodes (e.g. base stations and/or access points), which operate based on directive beams for serving one or more wireless user devices 120 such as User Equipment (UE). The wireless communication system may include and/or be connected to a core network (not shown) and/or other network parts responsible for network functions such as mobility management, connection to other networks and resource management.

In active mode, the connection of a moving UE must be seamlessly handed over as the UE moves across the different cell coverage areas in the network. Handover is the process of transferring an ongoing connection of a UE from one node (the serving) to another node (the target), or from one cell to another within the same node. This is done to accomplish a transparent service or service continuity over a larger area. The handover should happen without any loss of data and preferably with no interruption.

In legacy cell-based systems like LTE, the cell-specific reference signals (CRSs) have been used for mobility measurements. These are broadcasted in all neighbor cells in an always-on manner over the entire bandwidth, regardless of the presence or position of UEs in the system. The CRS are easy to measure and yield consistent results, but static CRS signaling leads to high resource usage, power consumption and constant inter-cell interference generation in the downlink.

All base stations continuously transmit pilot signals that UEs in own and neighbor cells use to estimate the target cell quality. This is also true in GSM (BCCH), WCDMA (CPICH) and in WiFi (beacon). Each UE performs periodic measurements and reports the measurement results to the network when certain reporting conditions are met (periodic or event based). If it is detected that the serving cell quality is getting close to another candidate's cell quality, a more detailed measurement process or a handover procedure may be initiated.

In some configurations, initial access signals and other associated signals like the Primary Synchronization Signal/ Secondary Synchronization Signal (PSS/SSS), if transmitted at a sufficient rate, may also be used for active mode mobility measurements. They allow estimating the link qualities with respect to the candidate cells, for the purposes of measurement reporting back to the network.

In modern beam-based systems, serving and target node identities are often no longer sufficient for maintaining seamless connections during inter-node handover. Handover management between narrow beams in neighboring base stations becomes a necessity, and the serving base station also needs to decide if a beam switch or beam update is necessary within the own cell. The serving link may thus effectively be the beam through which the base station is currently communicating with the UE, and the beam it will hand over or switch to becomes the target link.

In a beam-based system like NR, it is desired to avoid excessive static downlink reference signal (RS) signaling, so instead the network may turn on special Mobility Reference Signals (MRS) only when needed, e.g. when there are UEs found in a given network region or, in a UE-specific manner only in relevant candidate beams. It may be done periodically or when the network determines that a beam update for the UE may be needed, e.g. when decreasing serving beam quality is detected. Each activated beam transmits an MRS that carries the beam identity.

In 3GPP, it has been agreed that Channel State Information Reference Signal (CSI-RS) like signal structures may be used as an MRS for mobility measurements, in addition to the PSS/SSS signals. The motivation for using CSI-RS may be e.g. of the following:

Inter-TRP (Transmission Reception Point) mobility in multi-TRP cells where PSS/SSS is transmitted.

Desired beam mobility resolution is higher than PSS/SSS beam sweep resolution.

Wide-band measurements desired for improved fading robustness in moderately dispersive environments or to improve measurement accuracy.

In contrast to PSS/SSS, CSI-RS can be dynamically turned on and off and configured according to suitable parameters (period, bandwidth, number of unique links supported, and so forth) by the network based on the presence of UEs and their mobility needs.

To achieve high performance in a wireless network, there is a need for an efficient RRM solution. This will be increasingly important in the coming 5G deployments for several reasons. For efficient resource use, modern systems such as IEEE 802.11 ay and NR rely on advanced antenna solutions such as beam forming and beam tracking. In order to perform accurate beam tracking, extensive measurements and signaling are needed which is costly in terms of radio resources and energy consumption.

Another reason is that NR will operate on high frequencies where the radio signal is more sensitive, e.g. to blocking by persons, vehicles, buildings and other obstacles. The radio reception in a modern systems like IEEE 802.11 ay or NR operating in the mmWave band using a narrow beam can be lost completely if a person walks into the space between the transmitter and the receiver (indoors) or if a vehicle, such as a bus or a truck, drives between the transmitter and the receiver (outdoors). This will call for fast RRM algorithms that can make fast decisions to avoid the session drop/radio link failure proactively.

SUMMARY

It is a general object to improve radio resource management in wireless communication systems.

It is a specific object to provide a method for performing radio resource management in a wireless communication system.

It is also an object to provide a system for radio resource management in a wireless communication system.

Another object is to provide a network unit comprising a system for radio resource management.

Yet another object is to provide a radio resource management controller for a wireless communication system.

Still another is to provide a network unit comprising a radio resource management controller.

It is also an object to provide a computer program for performing, when executed, radio resource management in a wireless communication system.

Another object is to provide a corresponding computer-program product.

Yet another object is to provide an apparatus for performing radio resource management in a wireless communication system.

These and other objects are met by embodiments of the proposed technology.

According to a first aspect, there is provided a method for performing radio resource management in a wireless communication system. The wireless communication system is adapted to use directive beams for serving at least one user device. The method comprises:
 obtaining image information from at least one image sensor monitoring at least part of a radio coverage area of at least one network node of the wireless communication system;
 processing the obtained image information to predict a change in radio propagation characteristics between a network node of the wireless communication system and a user device;
 controlling a mobility reference signal for at least one directive beam in the wireless communication system and/or configuring measurements of the mobility reference signal and/or configuring reporting and/or processing of measurement results from measurements of the mobility reference signal, based on the predicted change in radio propagation characteristics.

In this way, it is possible to improve the radio resource management in modern wireless communication systems using directive beams. Examples of benefits include optimized measurements and signaling and the possibility for proactive radio resource management acting on events such as blocking before they occur.

According to a second aspect, there is provided a system for radio resource management in a wireless communication system. The wireless communication system is adapted to use directive beams for serving at least one user device. The system is configured to obtain image information from at least one image sensor monitoring at least part of a radio coverage area of at least one network node of the wireless communication system. The system is configured to process the obtained image information to predict a change in radio propagation characteristics between a network node of the wireless communication system and a user device. The system is further configured to control a mobility reference signal for at least one directive beam in the wireless communication system and/or configure measurements of the mobility reference signal and/or configure reporting and/or processing of measurement results from measurements of the mobility reference signal, based on the predicted change in radio propagation characteristics.

According to a third aspect, there is provided a network unit comprising a system for radio resource management according to the second aspect.

By way of example, the network unit may be a network node or a network device.

According to a fourth aspect, there is provided a radio resource management controller for a wireless communication system. The wireless communication system is adapted to use directive beams for serving at least one user device. The controller is adapted to control a mobility reference signal for at least one directive beam in the wireless communication system and/or adapted to configure measurements of the mobility reference signal and/or adapted to configure reporting and/or processing of measurement results from measurements of the mobility reference signal based on image information from at least one image sensor monitoring at least part of a radio coverage area of the wireless communication system.

According to a fifth aspect, there is provided a network unit comprising a radio resource management controller according to the fourth aspect.

According to a sixth aspect, there is provided a computer program for performing, when executed, radio resource management in a wireless communication system. The wireless communication system is adapted to use directive beams for serving at least one user device. The computer program comprises instructions, which when executed by at least one processor, cause the at least one processor to:
 obtain image information from at least one image sensor monitoring at least part of a radio coverage area of at least one network node of the wireless communication system;
 process the obtained image information to predict a change in radio propagation characteristics between a network node of the wireless communication system and a user device;
 generate, based on the predicted change in radio propagation characteristics, control information for controlling a mobility reference signal for at least one directive beam in the wireless communication system and/or for configuring measurements of the mobility reference signal and/or for configuring reporting and/or processing of measurement results measurements of the mobility reference.

According to a seventh aspect, there is provided a computer-program product comprising a computer-readable medium having stored thereon a computer program according to the sixth aspect.

According to an eighth aspect, there is provided an apparatus for performing radio resource management in a wireless communication system. The wireless communication system is adapted to use directive beams for serving at least one user device. The apparatus comprises an input module for obtaining image information from at least one image sensor monitoring at least part of a radio coverage area of at least one network node of the wireless communication system. The apparatus also comprises a processing module for processing the obtained image information to predict a change in radio propagation characteristics between a network node of the wireless communication system and a user device, and a control module for generating, based on the predicted change in radio propagation characteristics, control information for controlling a mobility reference signal for at least one directive beam in the wireless communication system and/or for configuring measurements of the mobility reference signal and/or for configuring reporting and/or processing of measurement results measurements of the mobility reference.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIGS. 25A-B are schematic flow diagrams illustrating examples of methods implemented in a communication system including, e.g. a host computer, and optionally also a base station and a user equipment in accordance with some embodiments.

DETAILED DESCRIPTION

Figure 1:
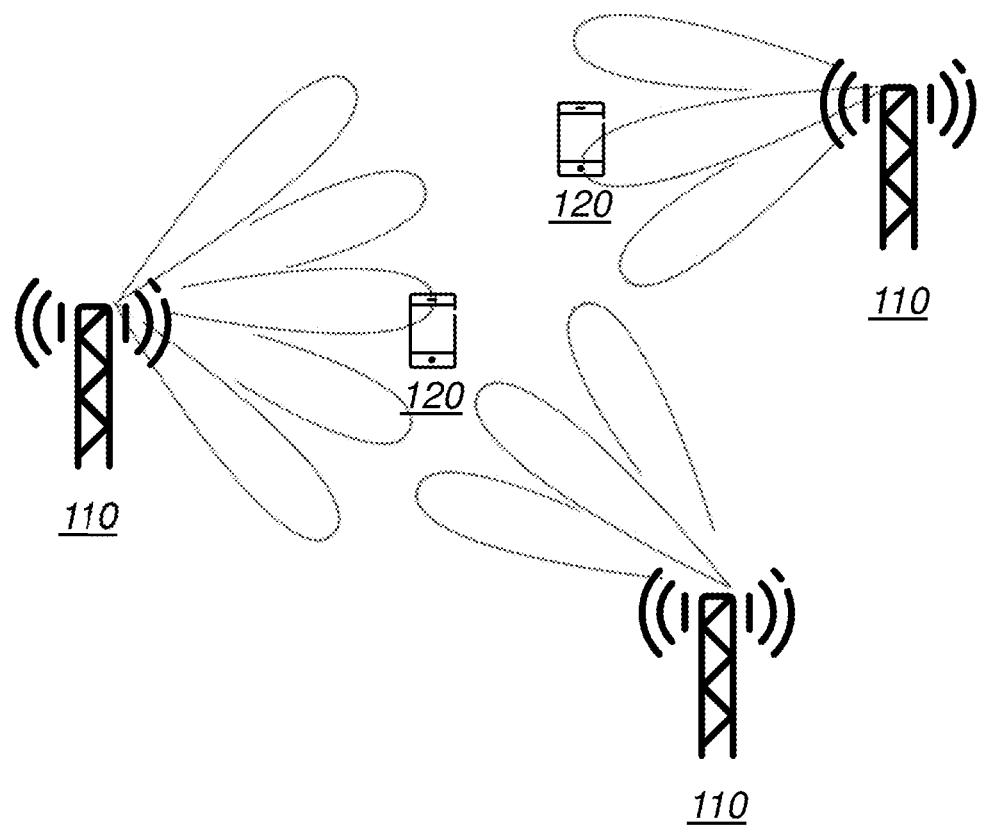
FIG. 1 is a schematic diagram illustrating an example of a wireless communication system operating using directive beams for serving wireless user devices.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network unit" may refer to any network unit associated with a wireless communication network, including network nodes and/or network devices.

As used herein, the non-limiting term "network node" may refer to radio access network nodes, base stations, access points, network control nodes such as network controllers, radio network controllers, base station controllers, access controllers, and the like, as well as other nodes associated with a wireless communication network. In particular, the term "base station" may encompass different types of radio base stations including standardized base station functions such as Node Bs, or evolved Node Bs (eNBs), gNodeBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the term "network device" may refer to any device located in connection with a communication network, including but not limited to devices in access networks, core networks and similar network structures. The term network device may also encompass cloud-based network devices.

Figure 2:
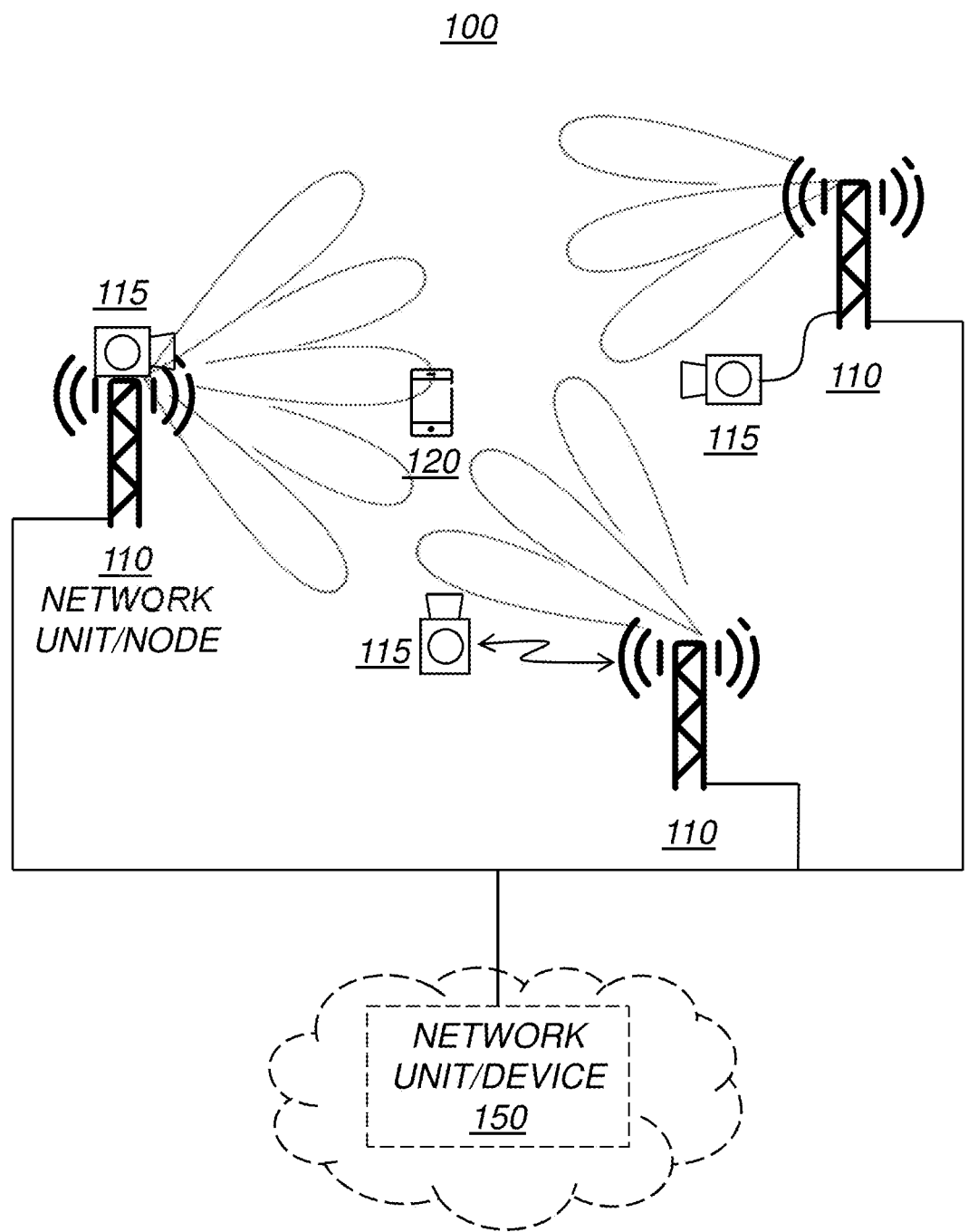
FIG. 2 is a schematic diagram illustrating another example of a wireless communication system comprising one or more image sensors for collecting image information representing at least part of a radio coverage area of the wireless communication system according to an embodiment.

FIG. 2 is a schematic diagram illustrating another example of a wireless communication system comprising one or more image sensors for collecting image information representing at least part of a radio coverage area of the wireless communication system according to an embodiment.

As mentioned, the wireless communication system 100 may be based on a radio access part including network units or network nodes 110 such as radio access network nodes (e.g. base stations and/or access points), which operate based on directive beams for serving one or more wireless user devices 120. The wireless communication system 100 further comprises one or more image sensors 115 such as cameras for monitoring at least part of a radio coverage area of the wireless communication system. The image sensor(s) 115 may be integrated with any of the network nodes 110 and/or provided as separate stand-alone units connected to any of the network nodes 110 using wired and/or wireless connection.

The network nodes 110 may be interconnected using any standard network interconnect, and may also be connected to a core network (not shown) and/or other network parts responsible for network functions such as mobility management, connection to other networks and resource management. This may be represented by the network unit or network device 150, which may be remotely located, e.g. in a cloud environment.

As mentioned, in modern wireless communication systems it is indeed important to be able control mobility reference signaling for directive beams and/or related configurations of measurements and/or measurement processing in an efficient manner.

A basic idea is to process image information obtained from one or more image sensors to predict a change in radio propagation characteristics between a network node of the wireless communication system and a user device, and to control a mobility reference signal for at least one directive beam in the wireless communication system and/or configure measurements of the mobility reference signal and/or configure reporting and/or processing of measurement results from measurements of the mobility reference signal, based on the predicted change in radio propagation characteristics.

Figure 3:
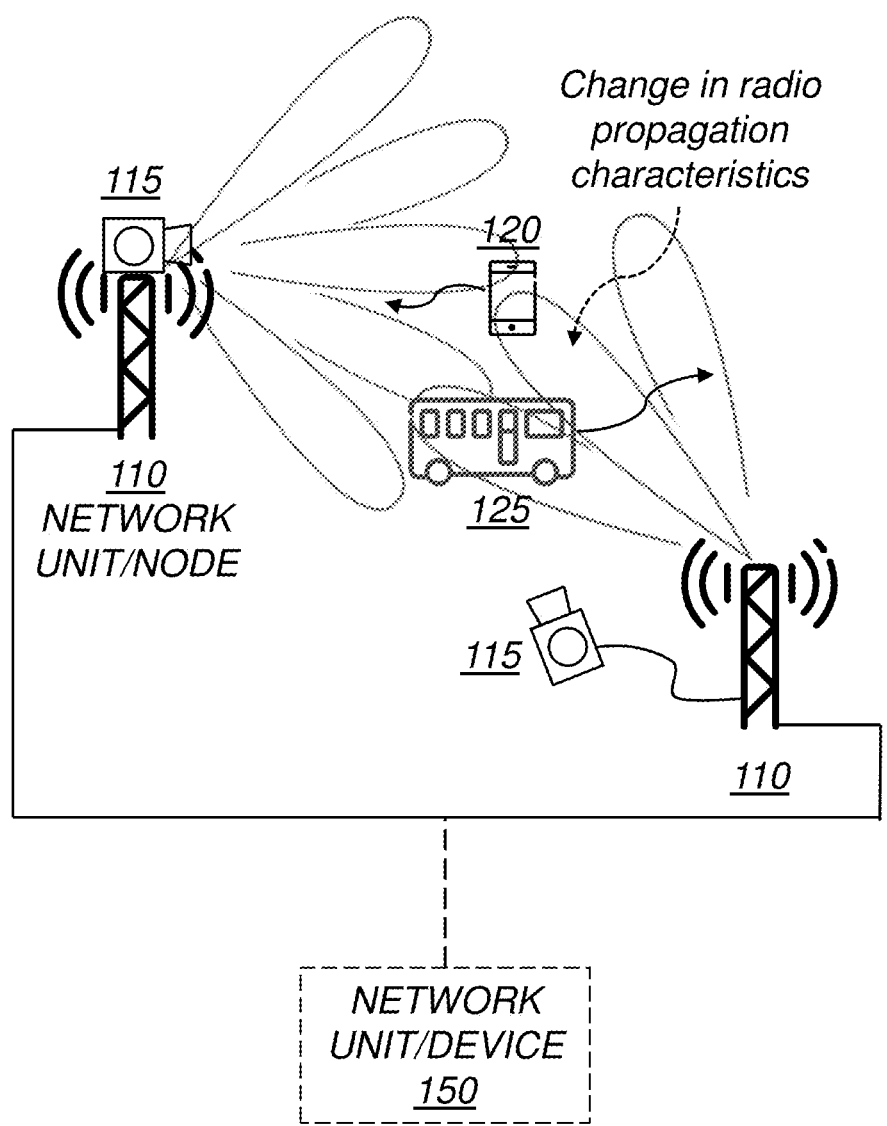
FIG. 3 is a schematic diagram illustrating yet another example of a wireless communication system in which a change in radio propagation characteristics between a network node and a user device can be predicted based on image information from one or more image sensors according to an embodiment.

FIG. 3 is a schematic diagram illustrating yet another example of a wireless communication system in which a change in radio propagation characteristics between a network node and a user device can be predicted based on image information from one or more image sensors according to an embodiment. In this example, it can be appreciated that the presence of one or more obstacles 125 such as vehicles and/or buildings can change the radio propagation conditions and/or characteristics between a network node 110 and a user device 120. It is also possible that movement of the user device 120 may change the radio propagation characteristics. Such changes may be predicted based on using image information obtained from one or more image sensors 115 monitoring the relevant area. By way of example, the image information may be used to estimate relative movement between a user device 120 and at least one obstacle 125 and/or relative movement between a user device 120 and a network node 110.

Figure 4:
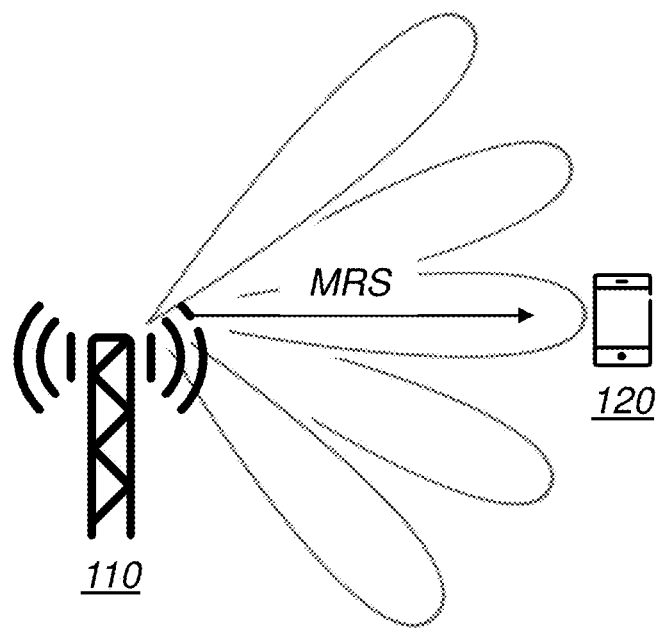
FIG. 4 is a schematic diagram illustrating an example of controlling a mobility reference signal for at least one directive beam in the wireless communication system and/or related actions.

FIG. 4 is a schematic diagram illustrating an example of controlling a mobility reference signal for at least one directive beam in the wireless communication system and/or related actions. In this example, relevant steps and/or actions in response to a predicted change in radio propagation characteristics may include:

i) controlling a mobility reference signal for at least one directive beam;
ii) configuring measurements of the mobility reference signal; and/or
iii) configuring reporting and/or processing of measurement results from measurements of the mobility reference signal.

Figure 5:
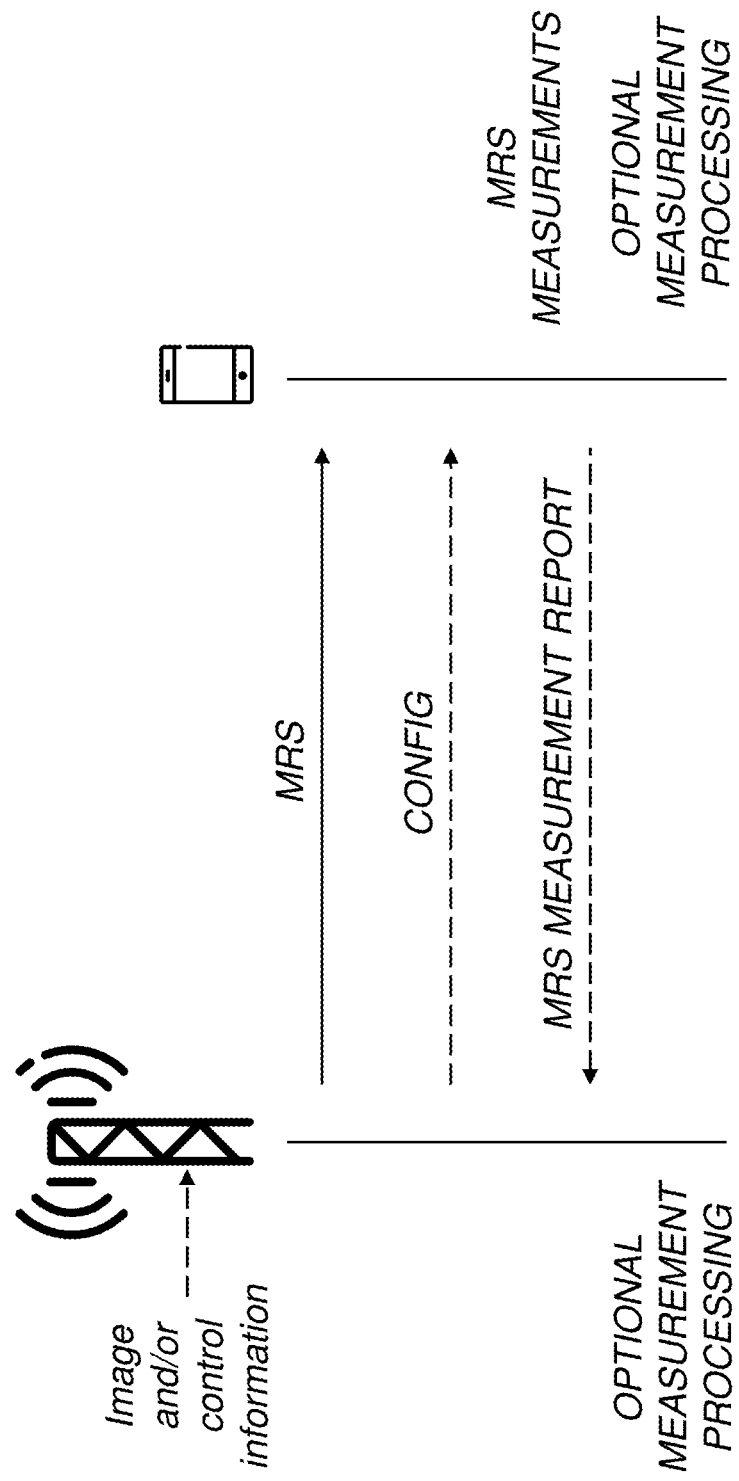
FIG. 5 is a schematic signaling and action diagram illustrating an example of signaling and/or actions for enabling improved radio resource management according to an embodiment.

FIG. 5 is a schematic signaling and action diagram illustrating an example of signaling and/or actions for enabling improved radio resource management according to an embodiment.

Basically, image information is obtained and used for predicting a change in radio propagation characteristics. This can be performed by any suitable network unit in the wireless communication system, e.g. by a network node such as a base station or by a more or less centralized network unit such as a cloud-based network unit or a network unit in the core network. In the latter case, corresponding control information may be transmitted to the relevant network unit for controlling the mobility reference signal and/or related actions.

Anyway, in response to a predicted change in radio propagation characteristics, a mobility reference signal (MRS) may be selectively transmitted for a directive beam reaching an intended wireless user device. The user device performs MRS measurements and performs the required measurement processing of the measurement results to take appropriate radio resource management decisions. Alternatively, the user device performs MRS measurements and transfers the measurement results to the network node, e.g. in a MRS measurement report, allowing the network node to perform the required measurement processing of the measurement results to take appropriate radio resource management decisions. Optionally, the network node may send configuration (CONFIG) signaling to the user device to configure the MRS measurements and/or the subsequent processing of the measurement results.

In a beam-based system like NR, it is desired to avoid excessive static downlink reference signaling, so the network may turn on special Mobility Reference Signals (MRS) only when needed, e.g. when there are UEs found in a given network region or, in a UE-specific manner only in relevant candidate beams. It may be done periodically or when the network determines that a beam update for the UE may be needed, e.g. when decreasing serving beam quality is detected. Each activated beam transmits an MRS that carries the beam identity.

In such a system, various MRS measurement and reporting strategies may be employed. In an LTE-like setup, the UE may be continuously monitoring the received sample stream for the presence of MRS. When some event criterion is fulfilled, e.g. any MRS is detected with signal quality exceeding a threshold, the UE would report the received beam ID and signal quality to the network.

For example, the reports may be used for mobility decisions and/or for building an Automatic Neighbor Relations (ANR) database at access node and/or beam resolution level. In an alternative, 5G-style setup, the network triggers MRS measurements by transmitting a measurement command via control signaling, e.g. when degrading serving link quality or another reason for initiating mobility measurements is identified. The measurement command may include reporting instructions and, in some cases, an explicit list of MRS to measure. The serving and/or other candidate access nodes may reserve uplink resources for receiving measurement reports in the UL.

With reference once again to FIG. 3, a possible and illustrative, but non-limiting use case may involve a user device 120 connected to and served by a first network node 110 on a certain beam. For example, due to an obstacle 125 that may disturb the communication, the movements of which is captured by one or more image sensors 115, a change in radio propagation characteristics may be predicted and a beam switch may be desirable. By way of example, if it is predicted that the obstacle 125 will block or at least disturb the radio signaling for the considered user device 120, it may be decided to activate a mobility reference signal for another beam in the same or more typically another network node 110. It may also be decided to perform MRS measurements more often or at another radio frequency for one or more beams in the same or another network node 110 and/or to use new thresholds and/or timers in the processing of the measurement results.

Figure 6:
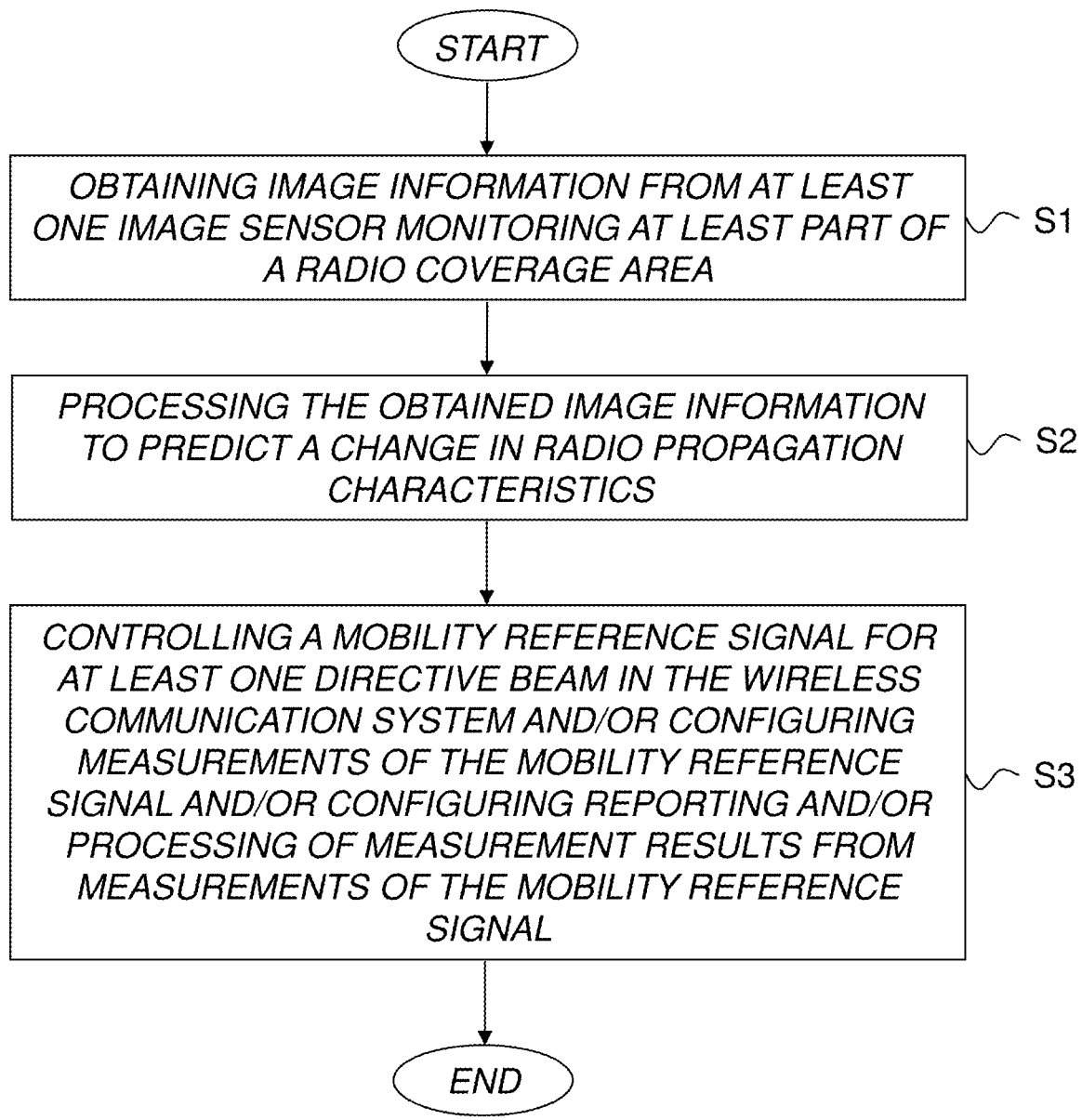
FIG. 6 is a schematic flow diagram illustrating an example of a method for performing radio resource management in a wireless communication system according to an embodiment.

FIG. 6 is a schematic flow diagram illustrating an example of a method for performing radio resource management in a wireless communication system according to an embodiment. The wireless communication system is adapted to use directive beams for serving at least one user device.

Basically, the method comprises:

S1: obtaining image information from at least one image sensor monitoring at least part of a radio coverage area of at least one network node of the wireless communication system;
S2: processing the obtained image information to predict a change in radio propagation characteristics between a network node of the wireless communication system and a user device;
S3: controlling a mobility reference signal for at least one directive beam in the wireless communication system and/or configuring measurements of the mobility reference signal and/or configuring reporting and/or processing of measurement results from measurements of the mobility reference signal, based on the predicted change in radio propagation characteristics.

In this way, it is possible to improve the radio resource management in modern wireless communication systems using directive beams. Examples of benefits include optimized measurements and signaling and the possibility for proactive radio resource management acting on events such as blocking before they occur.

Of course, it may be possible to combine the image information input for RRM decisions and/or actions with additional input from the wireless communication system, including radio-related measurements, but one of the advantages of the proposed technology relies at least partly on the fact that the image information input originates from an "independent" information source, namely one or more image sensors such as cameras present in the relevant area of the wireless communication system.

Figure 7:
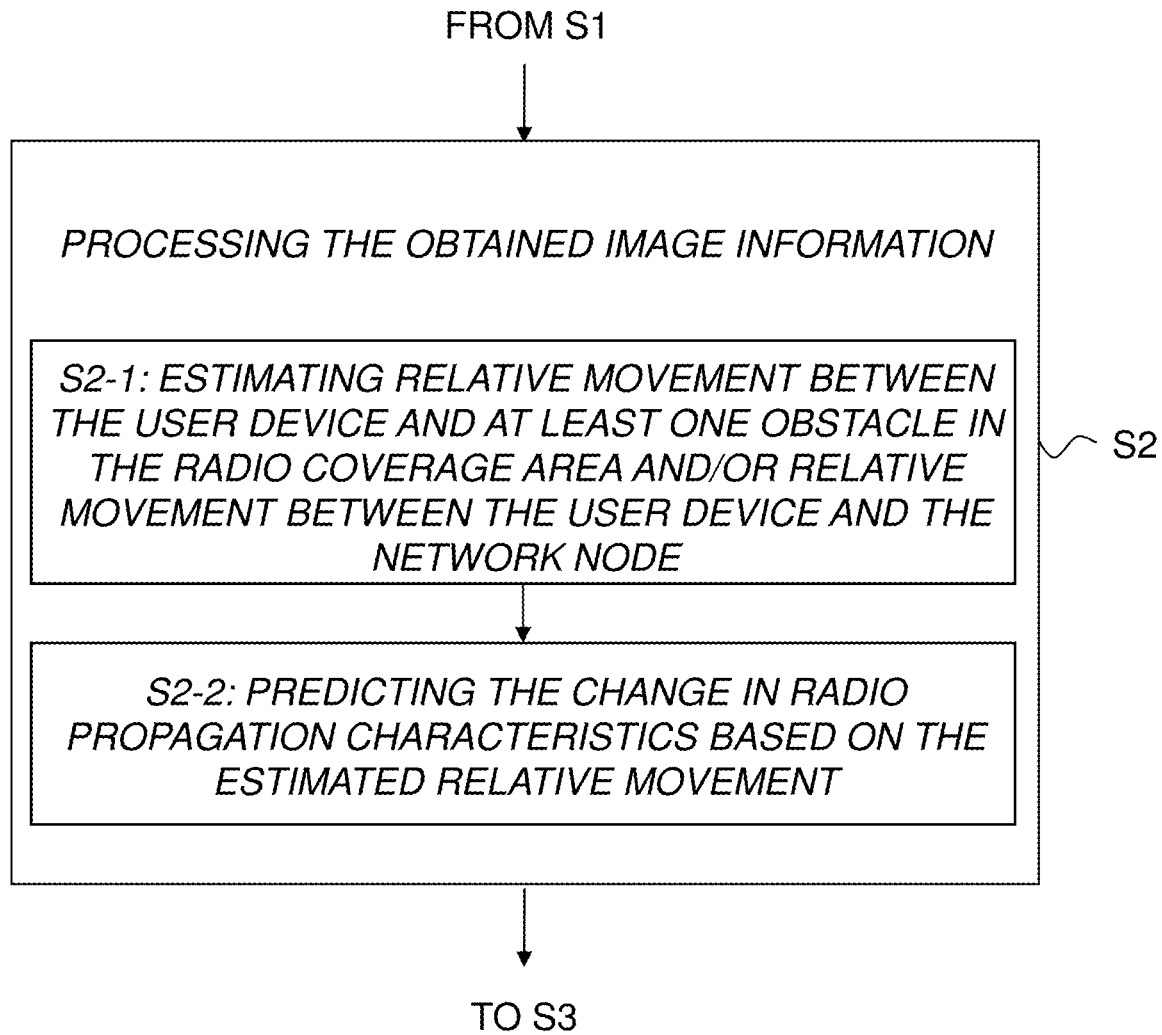
FIG. 7 is a schematic flow diagram illustrating an example of the step of processing the obtained image information according to an embodiment.

FIG. 7 is a schematic flow diagram illustrating an example of the step of processing the obtained image information according to an embodiment. In this example, the step of processing the obtained image information to predict a change in radio propagation characteristics between the network node and a user device comprises:

S2-1: estimating relative movement between the user device and at least one obstacle in the radio coverage area and/or relative movement between the user device and the network node; and S2-2: predicting the change in radio propagation characteristics based on the estimated relative movement.

For example, algorithms for image processing such as image feature recognition may be used to detect vehicles, pedestrians, and other obstacles. For more information on using cameras for human blockage prediction in wireless communications, reference can be made, e.g. to the article *Proactive Base Station Selection Based on Human Blockage Prediction Using RGB-D Cameras for mmWave Communications*, by Yuta Oguma et al, in 2015 IEEE Global Communications Conference (GLOBECOM), Dec. 6, 2015.

Figure 8:
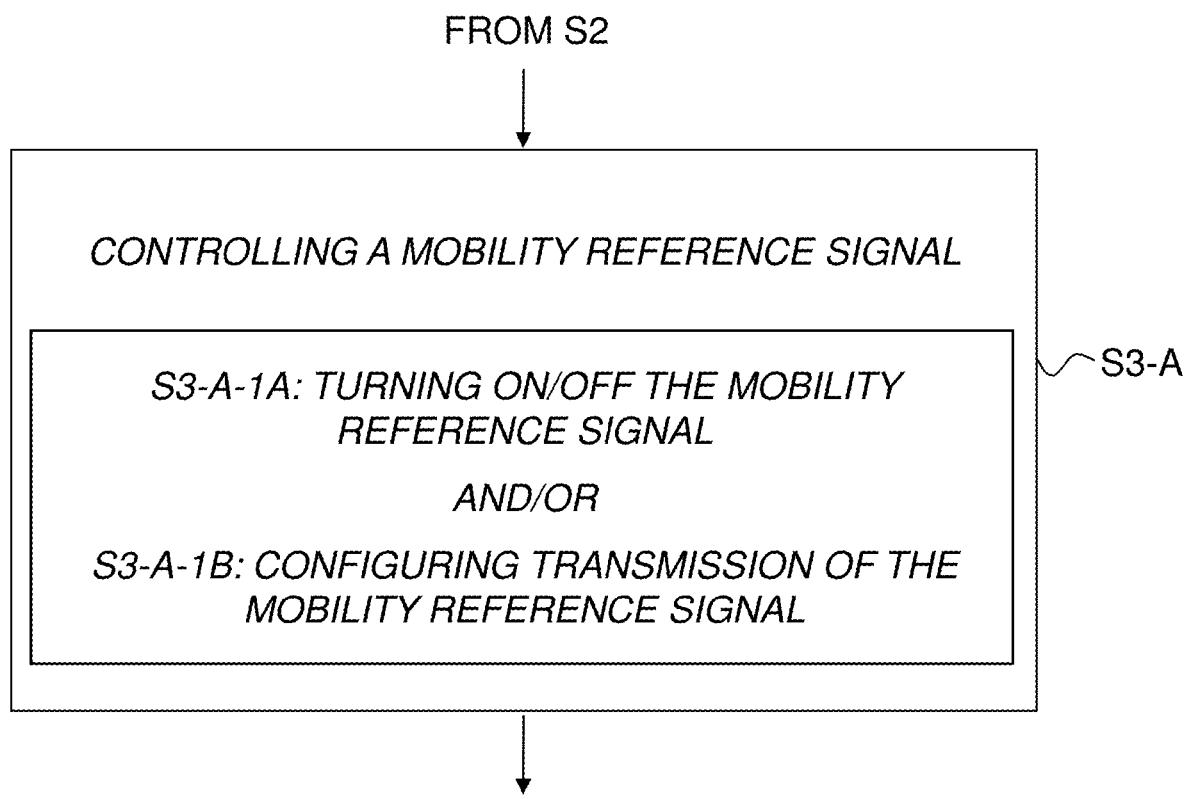
FIG. 8 is a schematic flow diagram illustrating an example of the step of controlling a mobility reference signal according to an embodiment.

FIG. 8 is a schematic flow diagram illustrating an example of the step of controlling a mobility reference signal according to an embodiment. In this example, the step S3-A of controlling a mobility reference signal comprises:

S3-A-1A: turning on/off the mobility reference signal; and/or

S3-A-1B: configuring transmission of the mobility reference signal.

Figure 9:
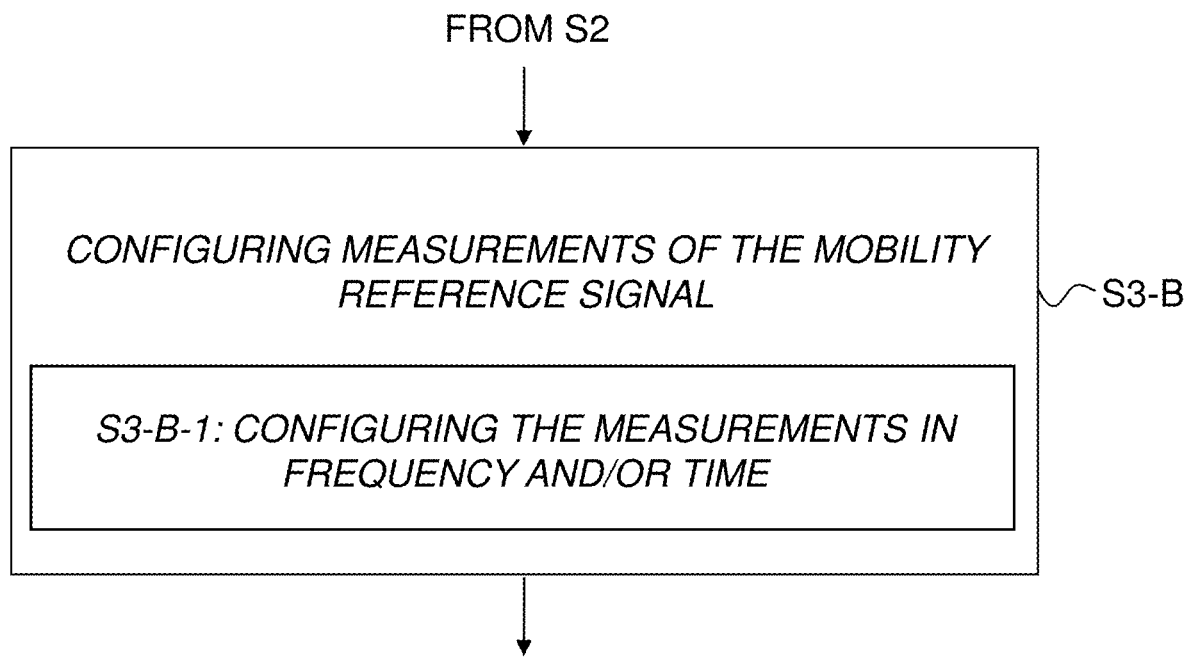
FIG. 9 is a schematic flow diagram illustrating an example of the step of configuring measurements of the mobility reference signal according to an embodiment.

FIG. 9 is a schematic flow diagram illustrating an example of the step of configuring measurements of the mobility reference signal according to an embodiment. In this example, the step S3-B of configuring measurements of the mobility reference signal comprises configuring S3-B-1 the measurements in frequency and/or time.

Figure 10:
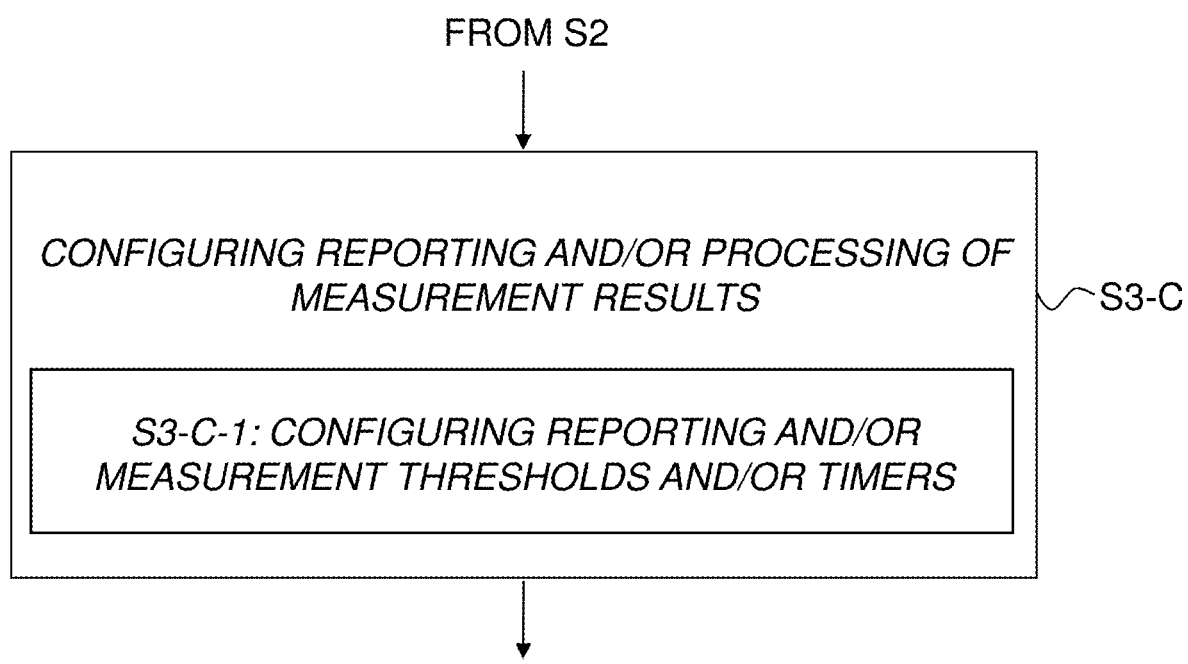
FIG. 10 is a schematic flow diagram illustrating an example of the step of configuring reporting and/or processing of measurement results from measurements of the mobility reference signal according to an embodiment.

FIG. 10 is a schematic flow diagram illustrating an example of the step of configuring reporting and/or processing of measurement results from measurements of the mobility reference signal according to an embodiment. In this example, the step S3-C of configuring reporting and/or processing of measurement results comprises configuring S3-C-1 reporting and/or measurement thresholds and/or timers.

By way of example, the image information may be obtained from multiple image sensors monitoring at least part of a radio coverage area of the wireless communication system.

Figure 11:
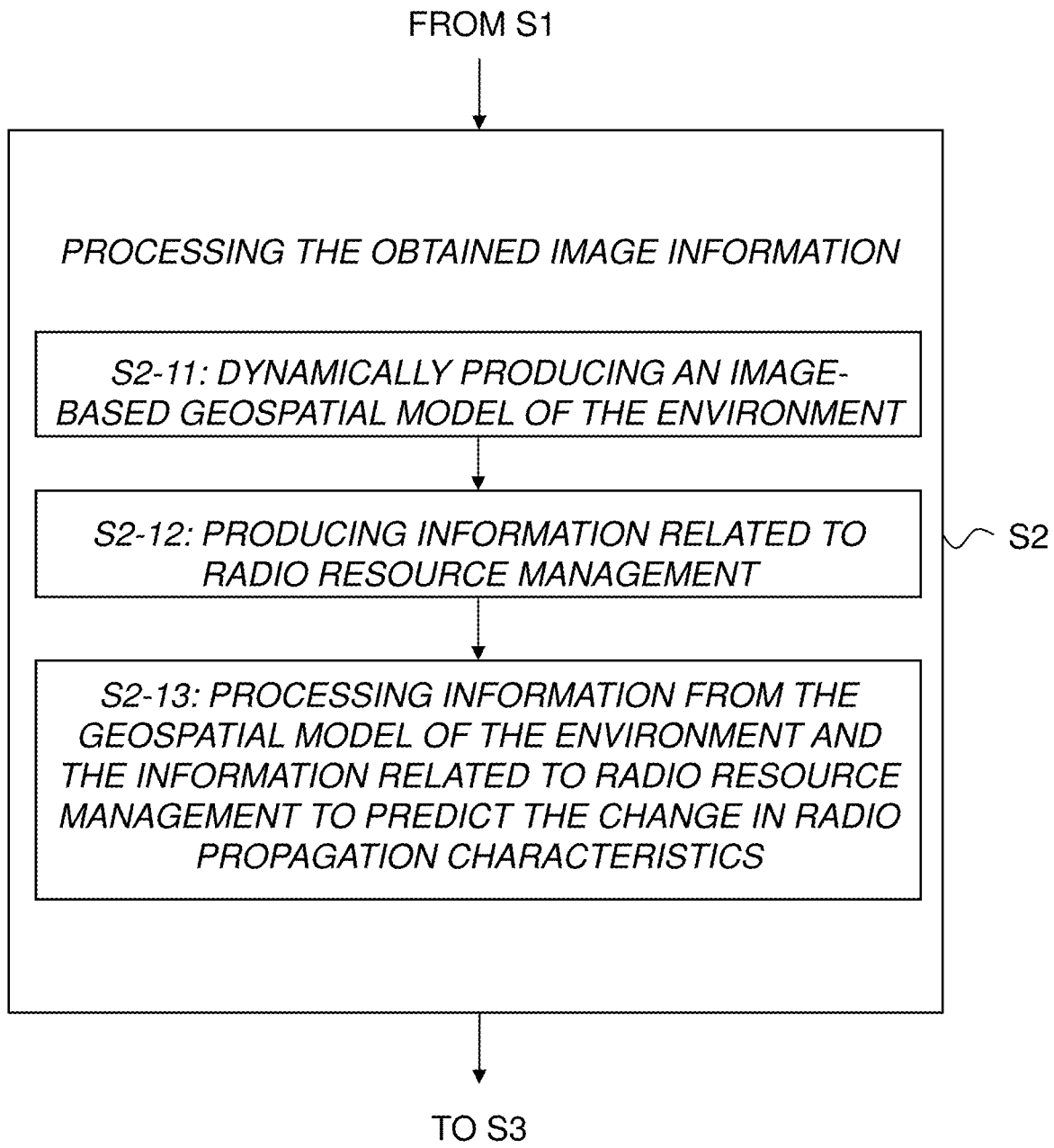
FIG. 11 is a schematic flow diagram illustrating another example of the step of processing the obtained image information according to an embodiment.

FIG. 11 is a schematic flow diagram illustrating another example of the step of processing the obtained image information according to an embodiment. In this particular example, the step S2 of processing the obtained image information to predict a change in radio propagation characteristics comprises:

S2-11: dynamically producing an image-based geospatial model of the environment related to the radio coverage area or at least part thereof based on the image information obtained from the multiple image sensors;

S2-12: producing information related to radio resource management associated with the radio coverage area or at least part thereof, and S2-13: processing information from the geospatial model of the environment and the information related to radio resource management to predict the change in radio propagation characteristics between the network node and the user device.

By way of example, the information related to radio resource management may be produced as a layer of radio resource management related information on top of the geospatial model of the environment.

Figure 12:
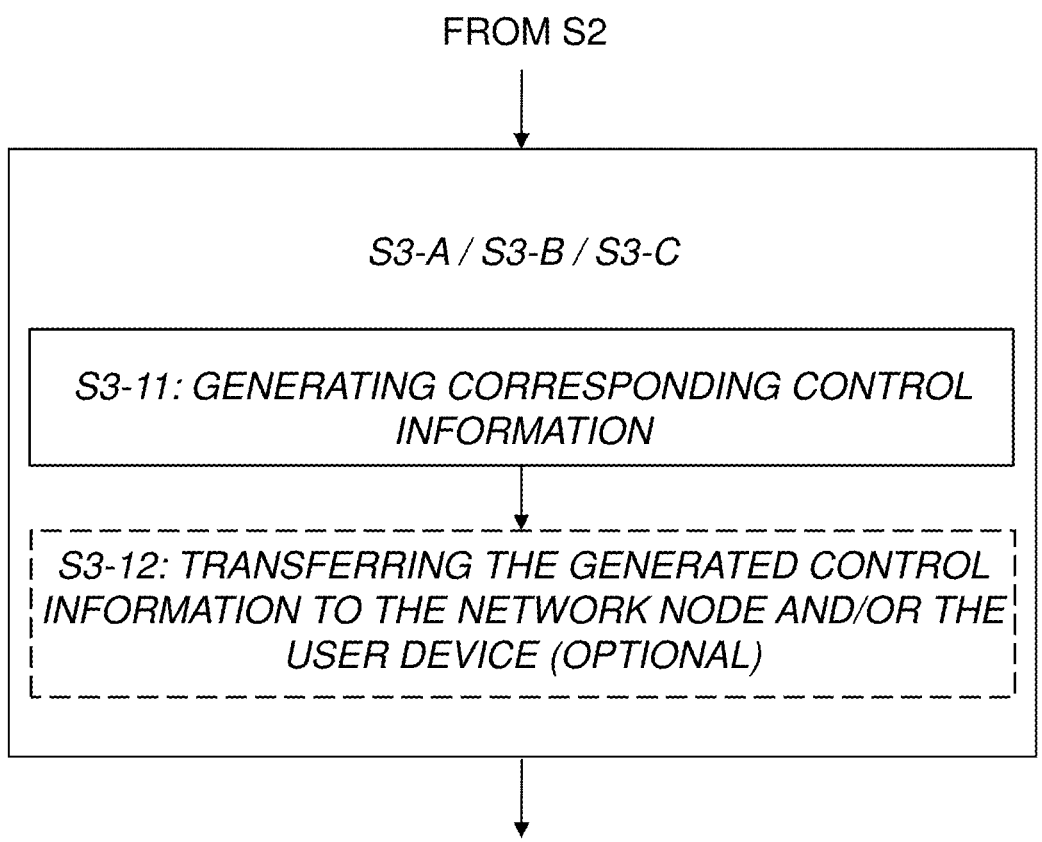
FIG. 12 is a schematic flow diagram illustrating an example of generating control information and optionally transferring such control information to the network node and/or user device according to an embodiment.

FIG. 12 is a schematic flow diagram illustrating an example of generating control information and optionally transferring such control information to the network node and/or user device according to an embodiment.

In this example, the step of controlling S3-A a mobility reference signal for at least one directive beam in the wireless communication system and/or configuring S3-B measurements of the mobility reference signal and/or configuring S3-C reporting and/or processing of measurement results comprises:

S3-11: generating, based on the predicted change in radio propagation characteristics, control information for controlling the mobility reference signal for at least one directive beam in the wireless communication system and/or for configuring the measurements of the mobility reference signal and/or for configuring reporting and/or processing of the measurement results; and S3-12: optionally transferring the generated control information to the network node and/or the user device, depending on where the control information is generated and in which entity the control information is to be applied.

In general, the image sensor(s) may be arranged in connection with at least one network node of the wireless communication system and/or the image sensor(s) may be integrated with the network node(s).

By way of example, the method may be performed by a network unit associated with the wireless communication system, e.g. a network node or a network device.

In the following, the proposed technology will be described with reference to specific, non-limiting examples.

For example, an image sensor such as a camera may be placed in an access point or a base station or at a separate location suitable to monitor part of the coverage area of the access point or base station. Information extracted from the image sensor may be used to assist the RRM functionality in the wireless system.

It is thus possible to predict that a transmission will soon be blocked or disturbed by a pedestrian or vehicle based on the image information, or by the station (STA) or user equipment (UE) moving out of line of sight, which means that a proactive RRM decision and/or action can be taken. The proactive RRM decision and/or action may refer to controlling mobility reference signaling and/or related actions, but optionally also configuring a UE with a new radio link which can be aggregated to the existing radio link. For example, a proactive RRM decision may be prepared by re-configuring the UE to monitor one or more additional reference signals or apply/report measurements. Also, the RRM thresholds and timers may be re-tuned to be able to act faster or better on the RRM decision.

Traditional RRM mechanisms rely on measurements performed in user equipment and base stations to make decisions of which radio resources to use, including which base station the user equipment should be connected to. In order to make fast RRM decisions frequent measurements need to be performed and the results need to be signaled to the node making the decisions, typically from user equipment to base station. This consumes both radio resources and energy.

In a camera-assisted RRM system, where at least part of the information is obtained via image processing, e.g. from a sensor in a network node (or close to it), accurate estimation of users movements in relation to obstacles and other users can be performed even without signaling over the radio interface. It is also possible to predict situations such as blocking by obstacles before they occur, in contrast to mechanisms that rely solely on measurements that are by nature reactive.

In an example, one or more image sensors are placed such that they can monitor parts of the coverage area of one or more network nodes such as NR base stations. In the following, the 3GPP NR technology will be used an example but the given ideas can just as well be applied for other similar wireless technologies such as, e.g., IEEE 802.11 ay. Typically, the sensor(s) would be placed on the base station or remote radio head but it could also be placed in a separate location that is suitable for the task.

For example, the sensor information may be collected to a node where image processing can be performed, e.g. in a network node in the access network such as a base station, or a network node in the core network or in a cloud-based network device. Information about users, obstacles and the physical environment may be extracted via image processing and the information is used to assist the RRM decisions and/or actions in the wireless network. In a simple example the image processing is performed in the base station and is used to assist the RRM decisions/actions made by the base station but, as indicated, the information can also be transferred to one or more neighboring base stations or to a central node in order to make centralized decisions.

In some embodiments, image processing can detect objects/patterns/IDs or similar. As an example, the object/pattern may refer to a car, and the id may refer to a license plate. In one of the embodiments, the object/pattern/ID information can be fed into a cloud storage for further processing. If the object/pattern/ID information can be matched to connectivity information already stored, the matched information can be used for the RRM decisions. In the simplest form, the connectivity information refers to a UE identity. In some embodiments, the cloud processing may be local, e.g., within the base station, or in other cases it can be centralized requiring data exchange among different network nodes.

In some embodiments, image processing data and radio data, e.g., UE measurements/beam specific data can be recursively collected locally or from another node/cloud and processed to identify and track the UEs. Furthermore, UE measurement reporting may be reconfigured to minimize load on the air interface when information already present in the system can be reused for scheduling the UE.

In one of the embodiments, it is predicted that the transmission will soon be blocked by a pedestrian or vehicle (e.g. a bus or train) based on the image information, which means that a proactive RRM configuration is needed.

In one of the embodiments, a mobility reference signal, such as CSI-RS can be dynamically turned on and off and/or configured according to suitable parameters (period, bandwidth, number of unique links supported, and so forth) by the network based on the image information.

In further embodiments, UE can be configured to monitor additional reference signals such as CSI-RS and/or apply/report more measurements such as RSRP, RSRQ, and CSI. Reconfigured measurements could be more frequent in time and/or frequency; and/or include more carrier frequencies and/or additional beams/cells/TRPs to measure on. Furthermore, the thresholds and timers related to RRM (e.g., in case of radio link failure or handover) can be tuned such that session drops or interruptions can be proactively avoided.

In one of the embodiments, a UE may be configured with an additional radio link, e.g. by means of dual connectivity (DC) or carrier aggregation (CA) techniques so that a redundant/diversity link can be aggregated to the existing radio link set. For instance, the UE can be aggregated with a cell/beam e.g., that is of a lower frequency; and/or configured with a secondary node. Coordinated multi-point (CoMP) transmission/reception techniques specified in the literature could also be considered for the link aggregation. Here, the aggregation does not only refer to the case that both links are simultaneously used but can also be interchangeably used (without requiring handover or any higher layer configuration e.g., by RRC) once it is configured.

Another example for an RRM decision is beam tuning. In this case, the serving beam can be tuned (narrowed/extended) such that the impact of the change in the environment is minimized.

In one of the embodiments, a fast moving object e.g., a car or a train, is to block a UE temporarily in a predicted future instance. If the blockage time is predicted to be short, then there is no need to trigger a fast mobility decision. On the contrary, UE and network would benefit from avoiding unnecessary beam tuning, CA/DC setup, (ping-pong) handover (i.e., first a handover to another node/cell/beam and then a handover back to initial node/cell/beam).

In an embodiment. in order to perform an RRM decision e.g., scheduling, CA/DC setup, handover or a CoMP configuration in a beam based system such as NR, reference signals for measurements are transmitted in the target cell in a number of beams, such that the user equipment can detect them and indicate to the network which beam it should be served with. By using information extracted from the camera/image sensor, the transmission of the mobility reference signals can be optimized both in terms of transmission frequency and in which beams they are transmitted. This would ensure a fast RRM decision with a limited amount of reference signals needed to be transmitted. Here, the mobility reference signals may refer to SS/CSI-RS signals and measurements may refer to RSRP, RSRQ, and CSI.

In yet another embodiment, new control signaling is needed to transfer the information from the video image to be utilized by the RRM algorithms. In the simplest case, the camera is placed locally in the base station and the image processing is done either locally or remotely. In other cases, the video/image source may itself be wireless and use even the same wireless interface to communicate the information to the RRM algorithms. The information received from the video processing may include for example:
- the location of possible UEs
- movement information on the UEs; direction, speed
- the location of possible blocking objects
- the size of possible blocking objects
- movement information on the blocking objects; direction, speed.

Cloud Processing of the Video Stream Data with Geospatial Information

In some embodiments, the image processing is not done directly in a base station (or wireless access point) but the image data may be transferred (e.g. streamed) to a cloud environment for processing. Based on the data analysis, the cloud environment would provide feedback to the relevant network node such as a NR base station. Benefit of this approach is that the image processing is offloaded from the base station. In some cases, streams from multiple wireless access points are combined in order to produce common model or view of the environment.

For example, data/video streams may be combined from multiple base stations in a city area. The data is streamed in real time to the cloud environment, keeping in mind that any cloud node and/or system may be distributed or centralized. Based on real-time video processing, the cloud system may predict events that will occur in the environments before the events are realized. In the following, a centralized cloud node/system will be considered as an example. For example, a bus is moving in a city area and a base station is sending a video feed to the centralized system, two other base stations are blocked by a high building and cannot therefore access the UEs inside the bus (not even with indirect signal propagation). The centralized system may produce 3D view of the environment (as the static objects are not moving) and predict from the movement pattern of the bus together with the 3D model how the radio environment will change for users inside the bus, and for others outside the bus. Therefore, the centralized system may already prepare, e.g., UE mobility information for the base stations that are not yet aware of the UEs (or other parameters described above). The model created in a centralized unit may be incorporated with the measurement and mobility data of the users to increase accuracy of the model. The centralized unit may also use machine learning algorithms to predict the system behavior form multi-parameter input including video stream and/or radio parameters.

In the above description of an embodiment, it may be possible to also use video streams, which are not originated from the base station. The centralized system may use this assistance video to create a model (e.g. 3D model from the environment) and create a layer of RRM related information on top of the model. Together with the real-time model and radio information, the centralized system may make predictive decisions on the network, such as preparing UE measurements or preparing UEs for RRM actions as discussed above as well as handover.

Yet, in another embodiment, the centralized system may incorporate data from base stations in the whole city area as well as it may include streams from the whole city area. In one embodiment, a base station transfers video stream to a cloud node (distributed or centralized), and the cloud node receives the video stream with geospatial data provided by the base station. In another embodiment, the cloud node merges multiple video streams with geospatial data to produce 3D view of the environment.

In some embodiments, video analysis is used to predict the material of the environments. In some cases, combined information from video model and material video analysis can be used to this information can be used to modify direction of the antenna elements in a base station or access point.

For example, a mechanism to improve accuracy of the static model is to measure distances between base stations that are sending the video stream. When combining the video streams, corrections can be made to the model (for example by using a three-point method).

In some embodiments, base station measurements may be combined with the model created from the video analysis. The base station measurements can be attached with geospatial information. The geospatial coordinates may be used to bind the measurement data to the model. A base station can potentially use UE measurements or base station measurements. When using UE measurements, UE geospatial information would preferably be stored. The measurements can be downlink or uplink, physical layer or measurements from layers above. Example measurements could be measurements described above (UL CSI, RSRP, RSRQ, RSSI, UL CSI, Cal).

It is thus possible to predict dynamic movement of the UEs by using a static model and video stream data with geospatial information. In some embodiments, the UE behavior can be predicted after the static model has been created.

It will be appreciated that the methods and arrangements described herein can be implemented, combined and re-arranged in a variety of ways.

For example, embodiments may be implemented in hardware, or in software for execution by suitable processing circuitry, or a combination thereof.

According to another aspect, there is provided a system for radio resource management in a wireless communication system, wherein the wireless communication system is adapted to use directive beams for serving at least one user device. The system is configured to obtain image information from at least one image sensor monitoring at least part of a radio coverage area of at least one network node of the wireless communication system. The system is configured to process the obtained image information to predict a change in radio propagation characteristics between a network node of the wireless communication system and a user device. The system is also configured to control a mobility reference signal for at least one directive beam in the wireless communication system and/or configure measurements of the mobility reference signal and/or configure reporting and/or processing of measurement results from measurements of the mobility reference signal, based on the predicted change in radio propagation characteristics.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Figure 13:
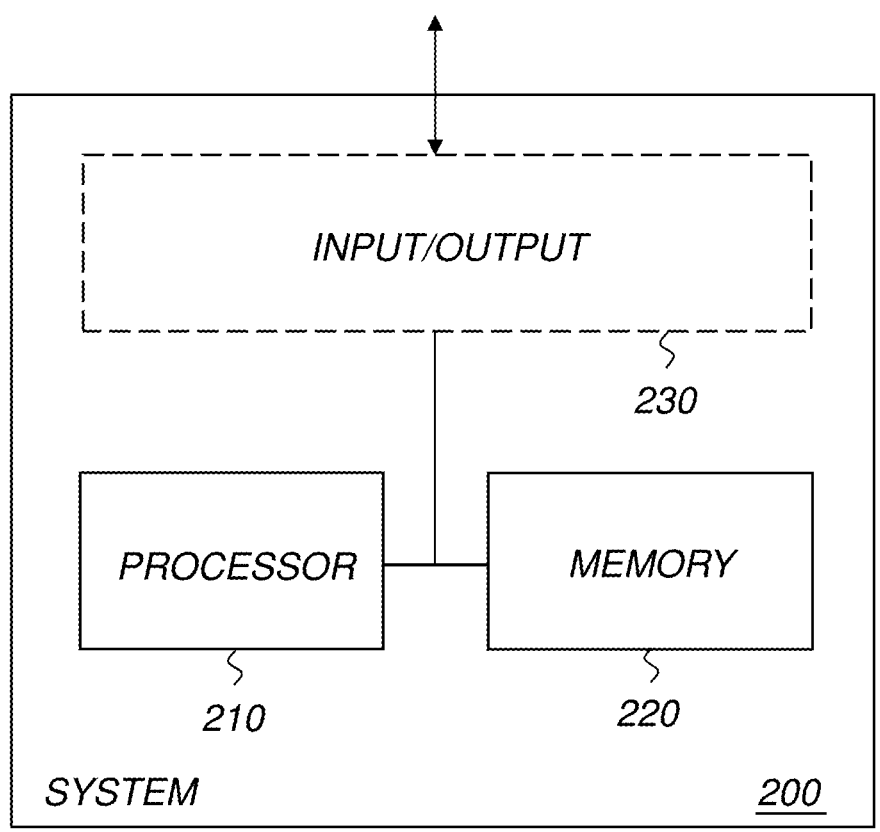
FIG. 13 is a schematic block diagram illustrating an example of a system for radio resource management according to an embodiment.

FIG. 13 is a schematic block diagram illustrating a non-limiting example of a system for radio resource management according to an embodiment. In this example, the system 200 comprises a processor 210 and memory 220, the memory 220 comprising instructions, which when executed by the processor 210, cause the processor to perform the radio resource management.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

Also, modern Graphics Processing Units (GPUs) allow for low delay image processing to be made with commodity hardware.

It should also be understood that it may be possible to re-use the general processing capabilities of any conventional device or unit in which the proposed technology is implemented. It may also be possible to re-use existing software, e.g. by reprogramming of the existing software or by adding new software components.

By way of example, the system may configured to process the obtained image information to predict a change in radio propagation characteristics between the network node and a user device based on estimating relative movement between the user device and at least one obstacle in the radio coverage area and/or relative movement between the user device and the network node and predicting the change in radio propagation characteristics based on the estimated relative movement.

For example, the system may be configured to control a mobility reference signal based on turning on/off the mobility reference signal and/or configuring transmission of the mobility reference signal.

Optionally, the system may be configured to configure measurements of the mobility reference signal in frequency and/or time.

As an example, the system may be configured to configure reporting and/or processing of measurement results based on configuring reporting and/or measurement thresholds and/or timers.

If appropriate or otherwise desired, the system may be configured to obtain the image information from multiple image sensors monitoring at least part of a radio coverage area of the wireless communication system.

In a particular example, the system may be configured to dynamically produce an image-based geospatial model of the environment related to the radio coverage area or at least part thereof based on the image information obtained from the multiple image sensors. Additionally, the system may be configured to produce information related to radio resource management associated with the radio coverage area or at least part thereof, and configured to process information from the geospatial model of the environment and the information related to radio resource management to predict the change in radio propagation characteristics between the network node and the user device.

For example, the system may be configured to produce the information related to radio resource management as a layer of radio resource management related information on top of the geospatial model of the environment.

Figure 14:
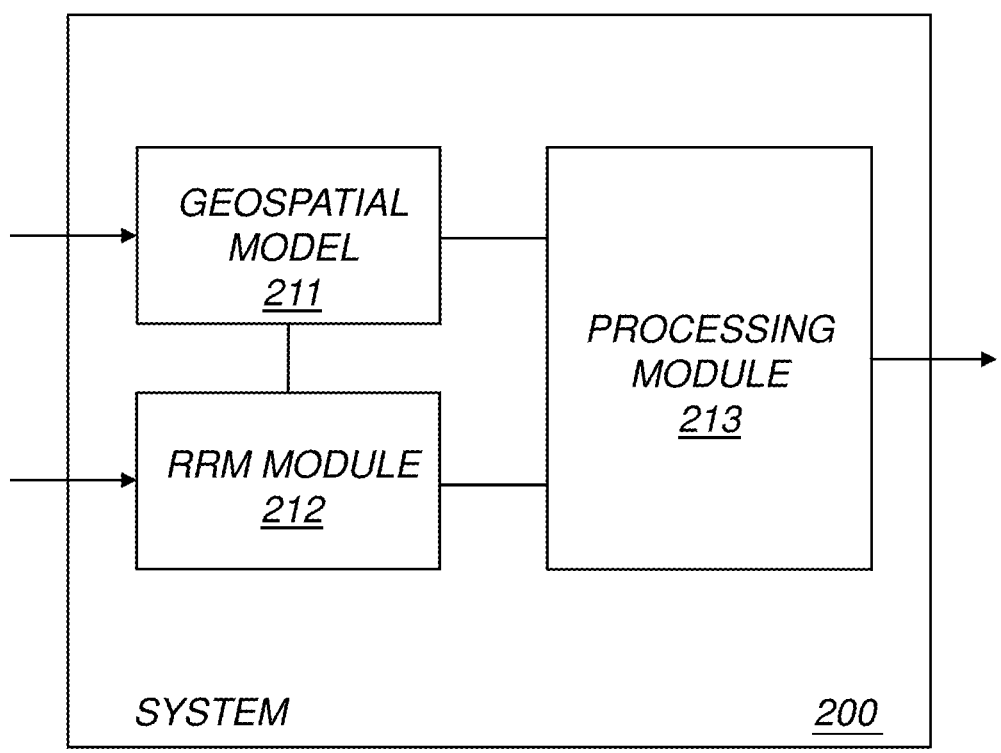
FIG. 14 is a schematic block diagram illustrating a particular example of a system for radio resource management according to an embodiment.

FIG. 14 is a schematic block diagram illustrating a particular example of a system for radio resource management according to an embodiment. In this example, the system comprises a module 211 for producing the geospatial model, a RRM module 212 for providing information related to radio resource management, and a processing module 213 for processing information from the geospatial model and the information related to radio resource management.

In general, the system may, by way of example, be configured to generate, based on the predicted change in radio propagation characteristics, control information for controlling the mobility reference signal for at least one directive beam in the wireless communication system and/or for configuring the measurements of the mobility reference signal and/or for configuring reporting and/or processing of the measurement results.

For example, the system may be configured to transfer the generated control information to the network node and/or the user device, depending on where the control information is generated and in which entity the control information is to be applied.

As previously indicated, the image sensor(s) may be arranged in connection with at least one network node of the wireless communication system and/or the image sensor(s) may even be integrated with the network node(s).

Figure 15:
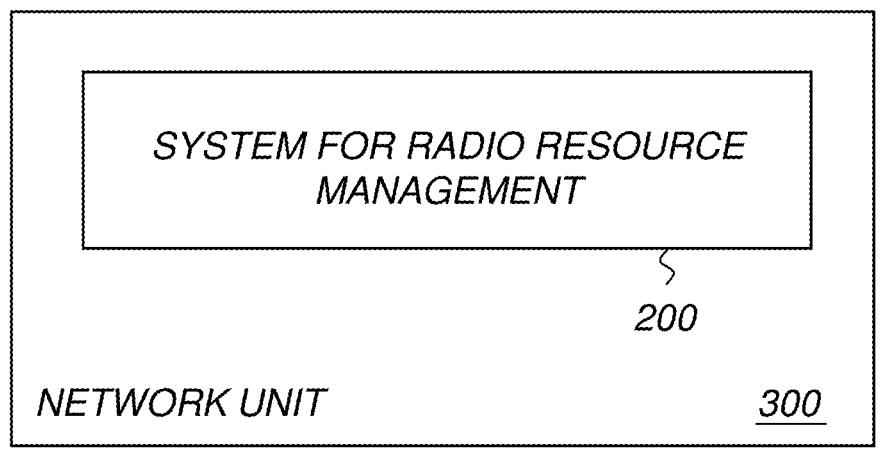
FIG. 15 is a schematic block diagram illustrating an example of a network unit comprising a system for radio resource management according to an embodiment.

FIG. 15 is a schematic block diagram illustrating an example of a network unit comprising a system for radio resource management according to an embodiment. In this example, the network unit 300 comprises a system 200 for radio resource management as described herein.

By way of example, the network unit may be a network node 110 or a network device 150, referring once again to FIGS. 2 and 3.

For example, the network node 110 may be a radio access network node.

As an example, the network device 150 may be a cloud-based network device.

According to another aspect, there is provided a radio resource management controller for a wireless communication system. The wireless communication system is adapted to use directive beams for serving at least one user device. The controller is adapted to control a mobility reference signal for at least one directive beam in the wireless communication system and/or adapted to configure measurements of the mobility reference signal and/or adapted to configure reporting and/or processing of measurement results from measurements of the mobility reference signal based on image information from at least one image sensor monitoring at least part of a radio coverage area of the wireless communication system.

Figure 16:
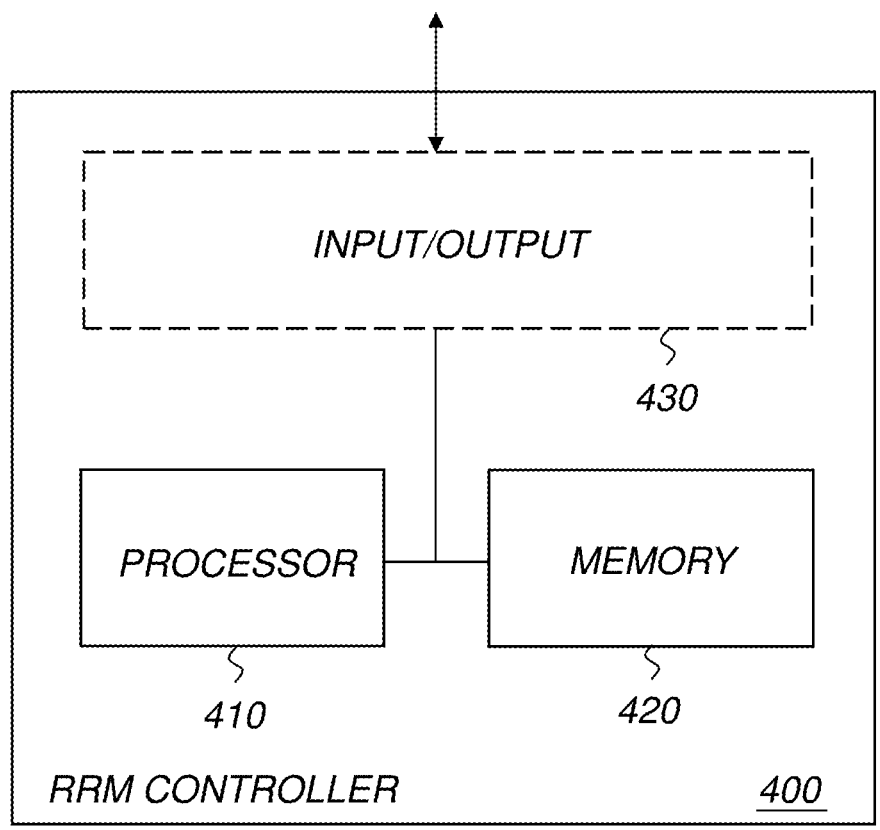
FIG. 16 is a schematic block diagram illustrating an example of a radio resource management controller for a wireless communication system according to an embodiment.

FIG. 16 is a schematic block diagram illustrating an example of a radio resource management controller for a wireless communication system according to an embodiment. In this example, the radio resource management (RRM) controller 400 comprises a processor 410 and memory 420, the memory 420 comprising instructions, which when executed by the processor 410, cause the processor to perform the actions of the radio resource management controller.

Figure 17:
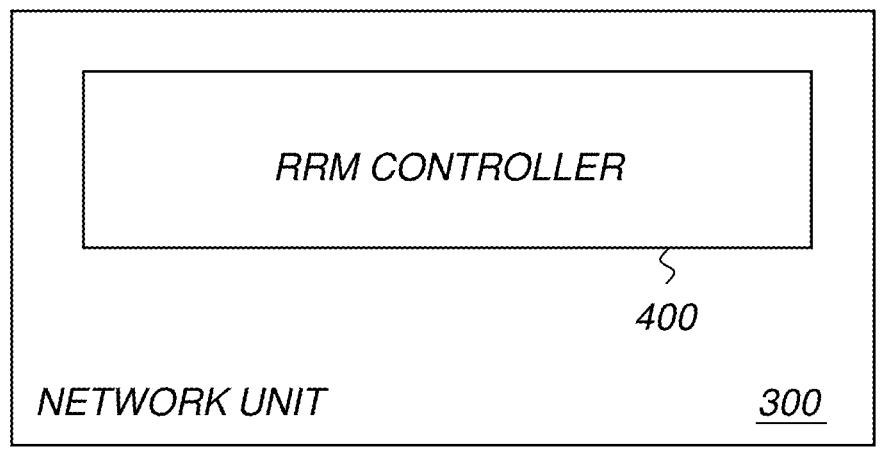
FIG. 17 is a schematic block diagram illustrating an example of a network unit comprising a radio resource management controller according to an embodiment.

FIG. 17 is a schematic block diagram illustrating an example of a network unit comprising a radio resource management controller according to an embodiment. In this example, the network unit 300 comprises a radio resource management controller (RRM) 400 as described herein.

Figure 18:
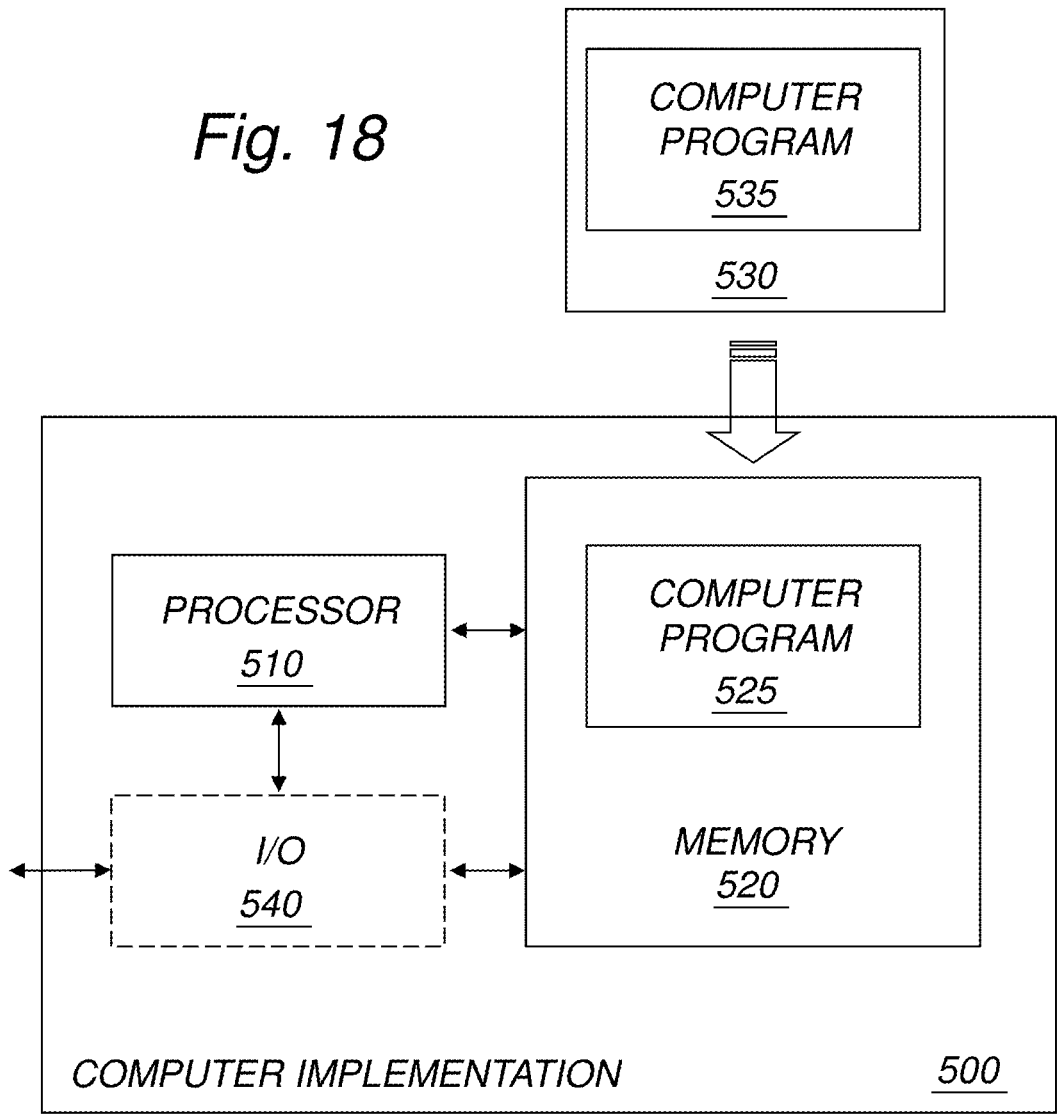
FIG. 18 is a schematic diagram illustrating an example of a computer implementation according to an embodiment.

FIG. 18 is a schematic diagram illustrating an example of a computer implementation 500 according to an embodiment. In this particular example, at least some of the steps, functions, procedures, modules and/or blocks described herein are implemented in a computer program 525; 535, which is loaded into the memory 520 for execution by processing circuitry including one or more processors 510. The processor(s) 510 and memory 520 are interconnected to each other to enable normal software execution. An optional input/output device 540 may also be interconnected to the processor(s) 510 and/or the memory 520 to enable input and/or output of relevant data such as input parameter(s) and/or resulting output parameter(s).

It is also possible to provide a solution based on a combination of hardware and software. The actual hardware-software partitioning can be decided by a system designer based on a number of factors including processing speed, cost of implementation and other requirements.

The term 'processor' should be interpreted in a general sense as any system or device capable of executing program code or computer program instructions to perform a particular processing, determining or computing task.

The processing circuitry including one or more processors 510 is thus configured to perform, when executing the computer program 525, well-defined processing tasks such as those described herein.

In a particular aspect, there is provided a computer program 525; 535 performing, when executed, radio resource management in a wireless communication system, wherein the wireless communication system is adapted to use directive beams for serving at least one user device. The computer program 525; 535 comprises instructions, which when executed by at least one processor 510, cause the at least one processor to:

obtain image information from at least one image sensor monitoring at least part of a radio coverage area of at least one network node of the wireless communication system;

process the obtained image information to predict a change in radio propagation characteristics between a network node of the wireless communication system and a user device;

generate, based on the predicted change in radio propagation characteristics, control information for controlling a mobility reference signal for at least one directive beam in the wireless communication system and/or for configuring measurements of the mobility reference signal and/or for configuring reporting and/or processing of measurement results measurements of the mobility reference.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 525; 535 may be realized as a computer program product, which is normally carried or stored on a computer-readable medium 520; 530, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 19:
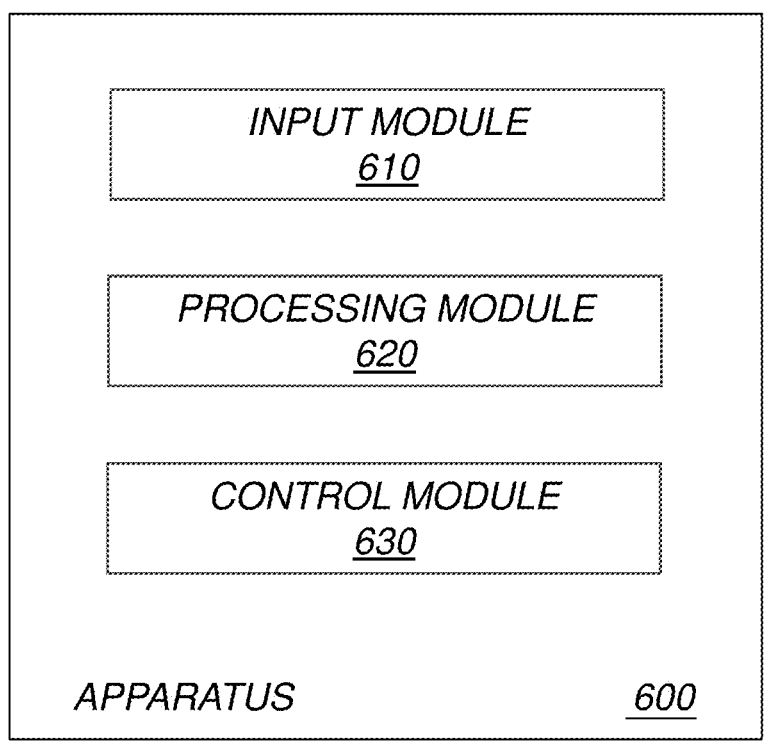
FIG. 19 is a schematic diagram illustrating an example of an apparatus for performing radio resource management in a wireless communication system according to an embodiment.

FIG. 19 is a schematic diagram illustrating an example of an apparatus for performing radio resource management in a wireless communication system. The wireless communication system is adapted to use directive beams for serving at least one user device. The apparatus 600 comprises:
  an input module 610 for obtaining image information from at least one image sensor monitoring at least part of a radio coverage area of at least one network node of the wireless communication system;
  a processing module 620 for processing the obtained image information to predict a change in radio propagation characteristics between a network node of the wireless communication system and a user device; and
  a control module 630 for generating, based on the predicted change in radio propagation characteristics, control information for controlling a mobility reference signal for at least one directive beam in the wireless communication system and/or for configuring measurements of the mobility reference signal and/or for configuring reporting and/or processing of measurement results measurements of the mobility reference.

Alternatively it is possible to realize the module(s) in FIG. 19 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 20:
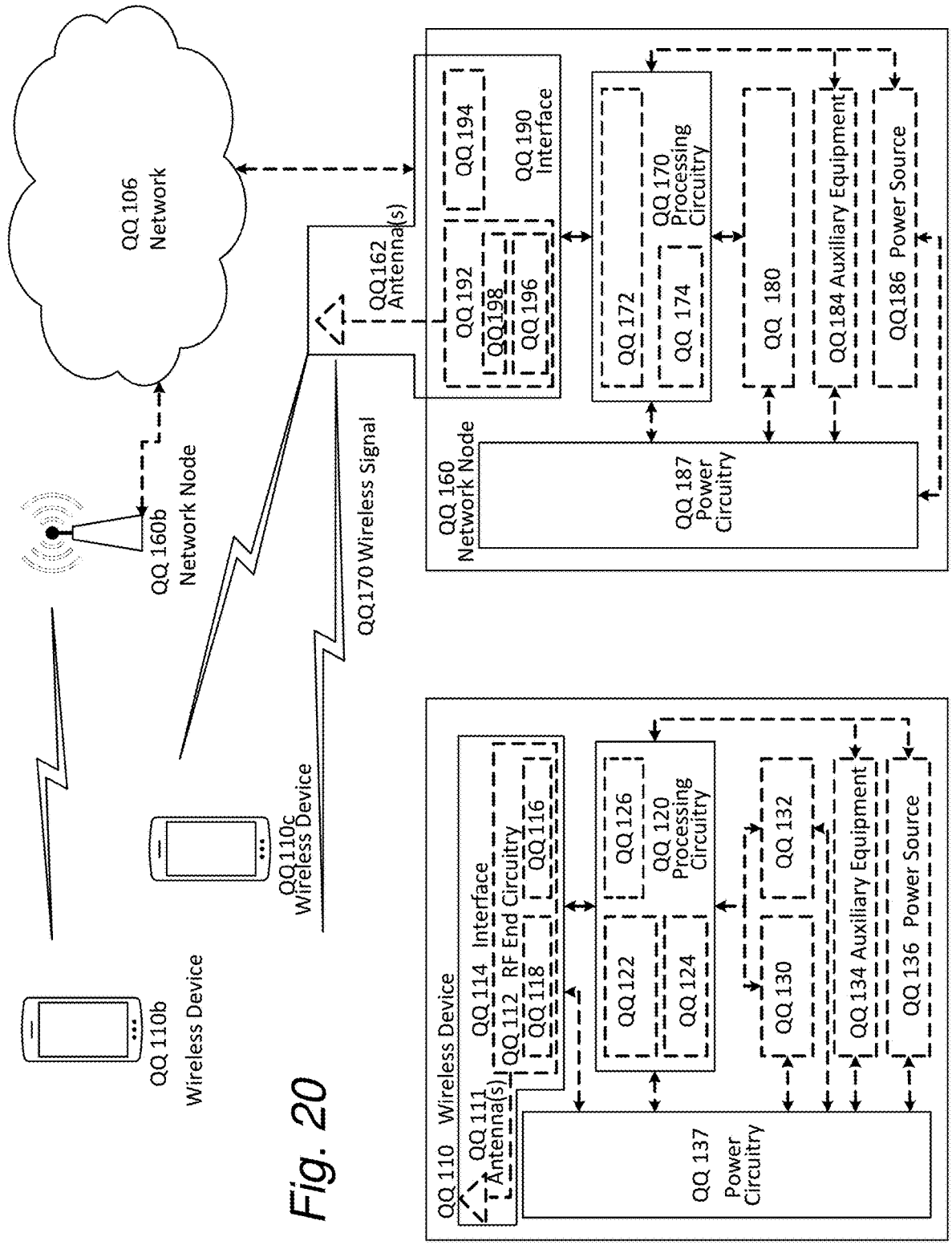
FIG. 20 is a schematic diagram illustrating an example of a wireless network in accordance with some embodiments.

By way of example, the "virtual" apparatus may be implemented in a wireless device or network node (e.g., wireless device QQ110 or network node QQ160 shown in FIG. 20). The apparatus is operable to carry out the example method(s) described herein, e.g. with reference to any of FIGS. 6-12 and possibly any other processes or methods disclosed herein. It is also to be understood that the method(s) of any of FIGS. 6-12 is not necessarily carried out solely by the apparatus in FIG. 19. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
  Consolidation of network functionality into virtualized software running on customized or generic hardware. This is sometimes referred to as network function virtualization.
  Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to provide efficient radio resource management in modern wireless communication systems. In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 20-26.

FIG. 20 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192.

The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 20 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 21:
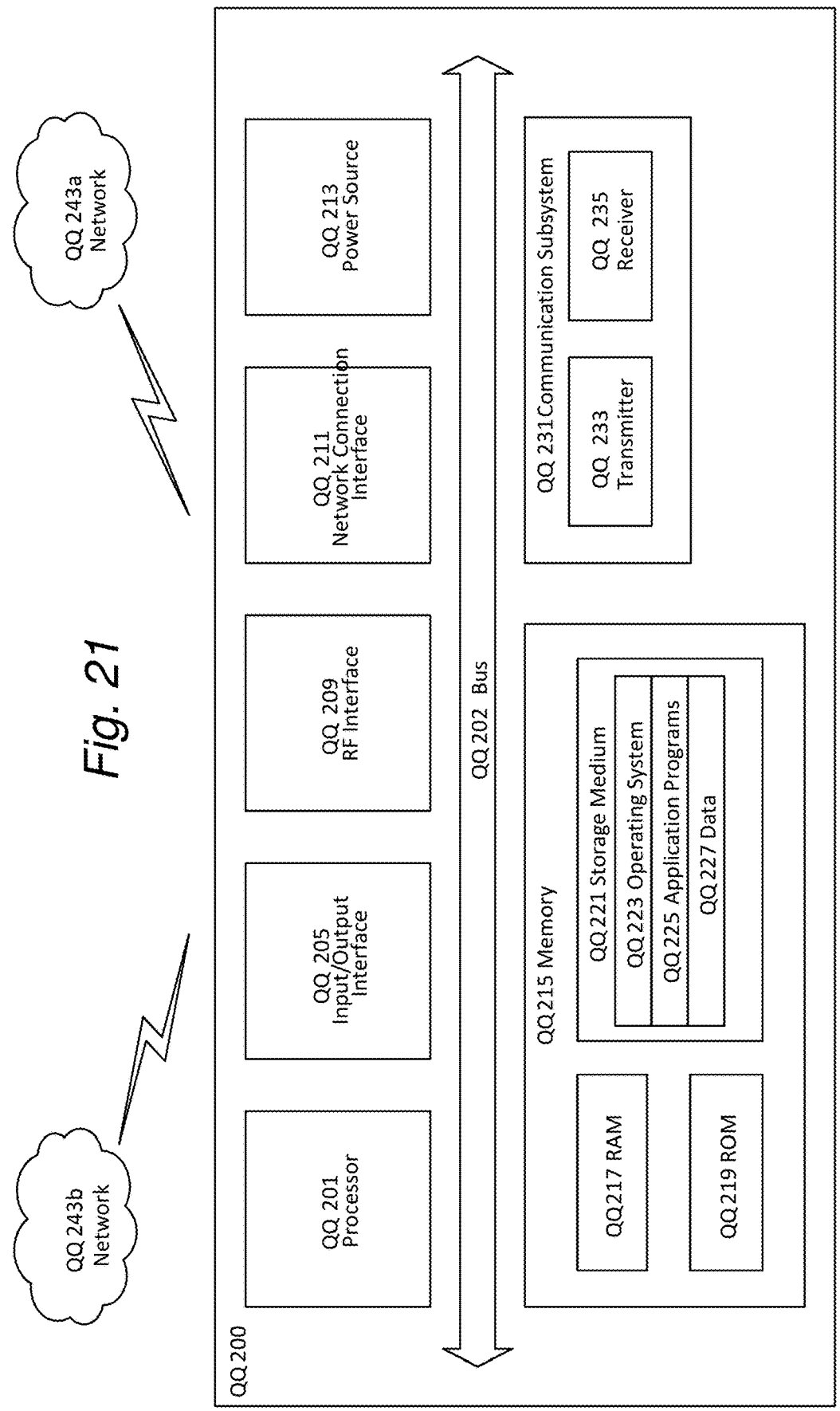
FIG. 21 is a schematic diagram illustrating an example of an embodiment of a UE in accordance with various aspects described herein.

FIG. 21 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 21, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 21, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 22:
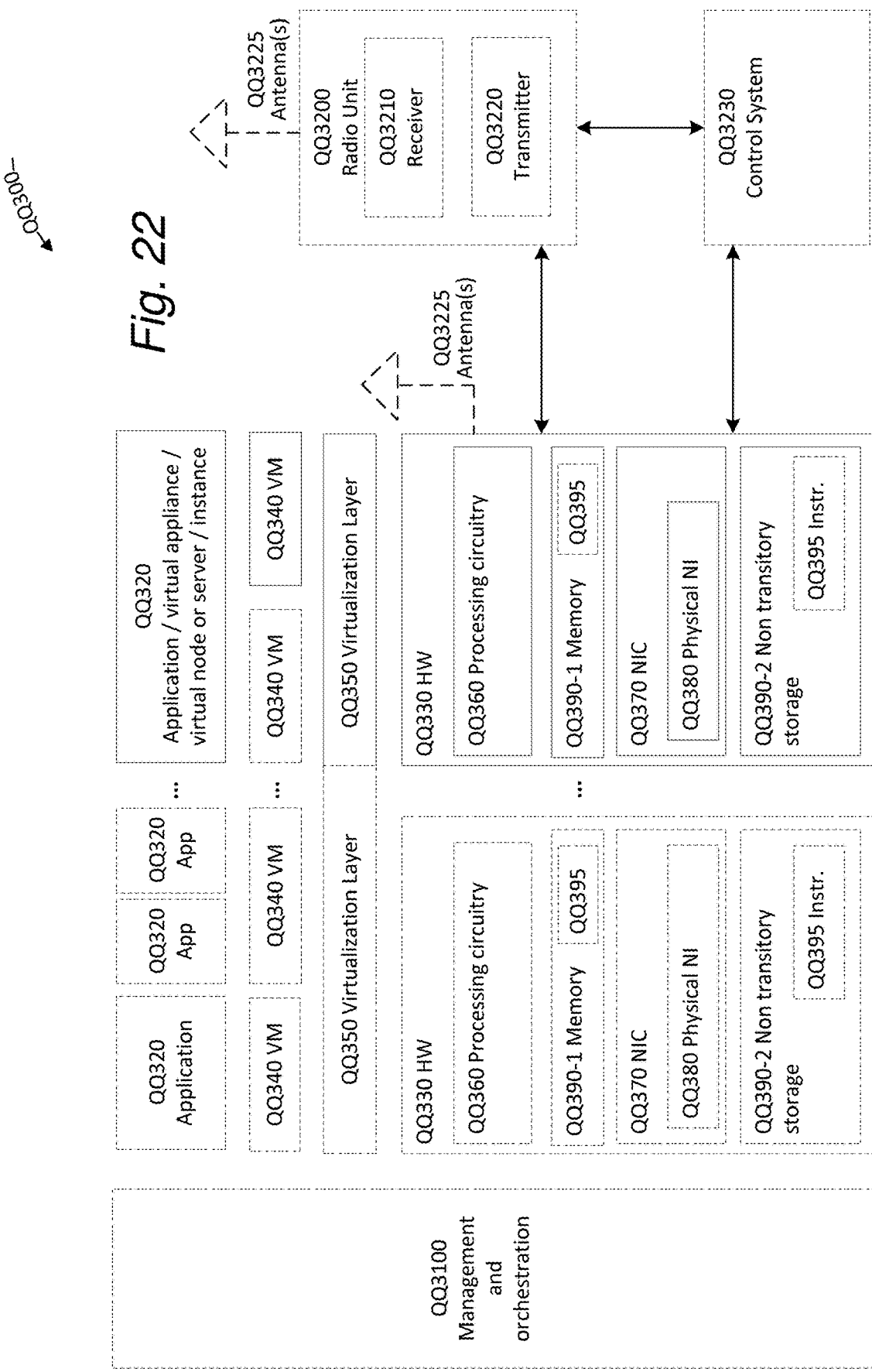
FIG. 22 is a schematic block diagram illustrating an example of a virtualization environment in which functions implemented by some embodiments may be virtualized.

FIG. 22 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 22, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 22.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 23:
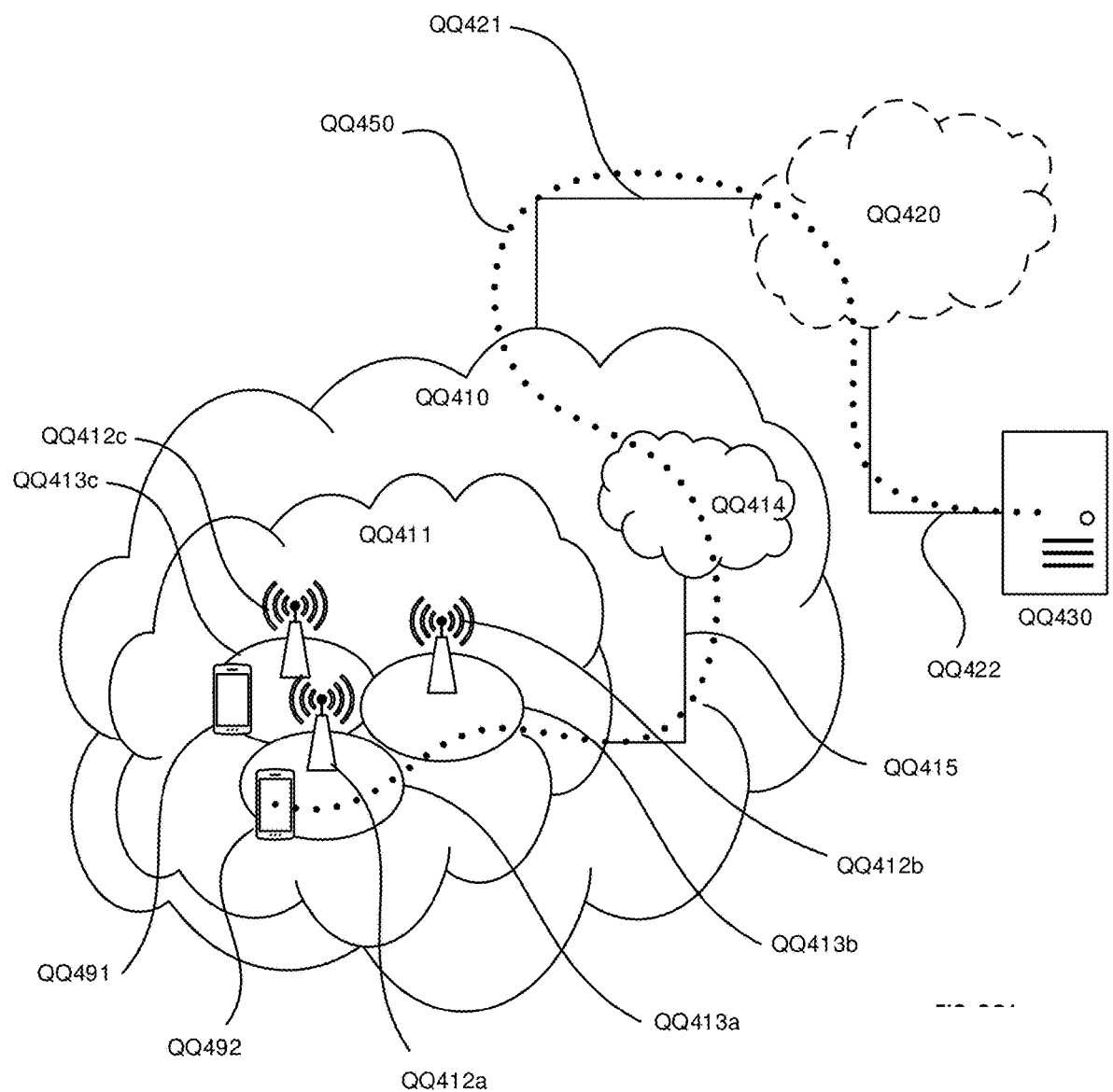
FIG. 23 is a schematic diagram illustrating an example of a telecommunication network connected via an intermediate network to a host computer in accordance with some embodiments.

FIG. 23 is a schematic diagram illustrating an example of a telecommunication network connected via an intermediate network to a host computer in accordance with some embodiments.

With reference to FIG. 23, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 23 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 24:
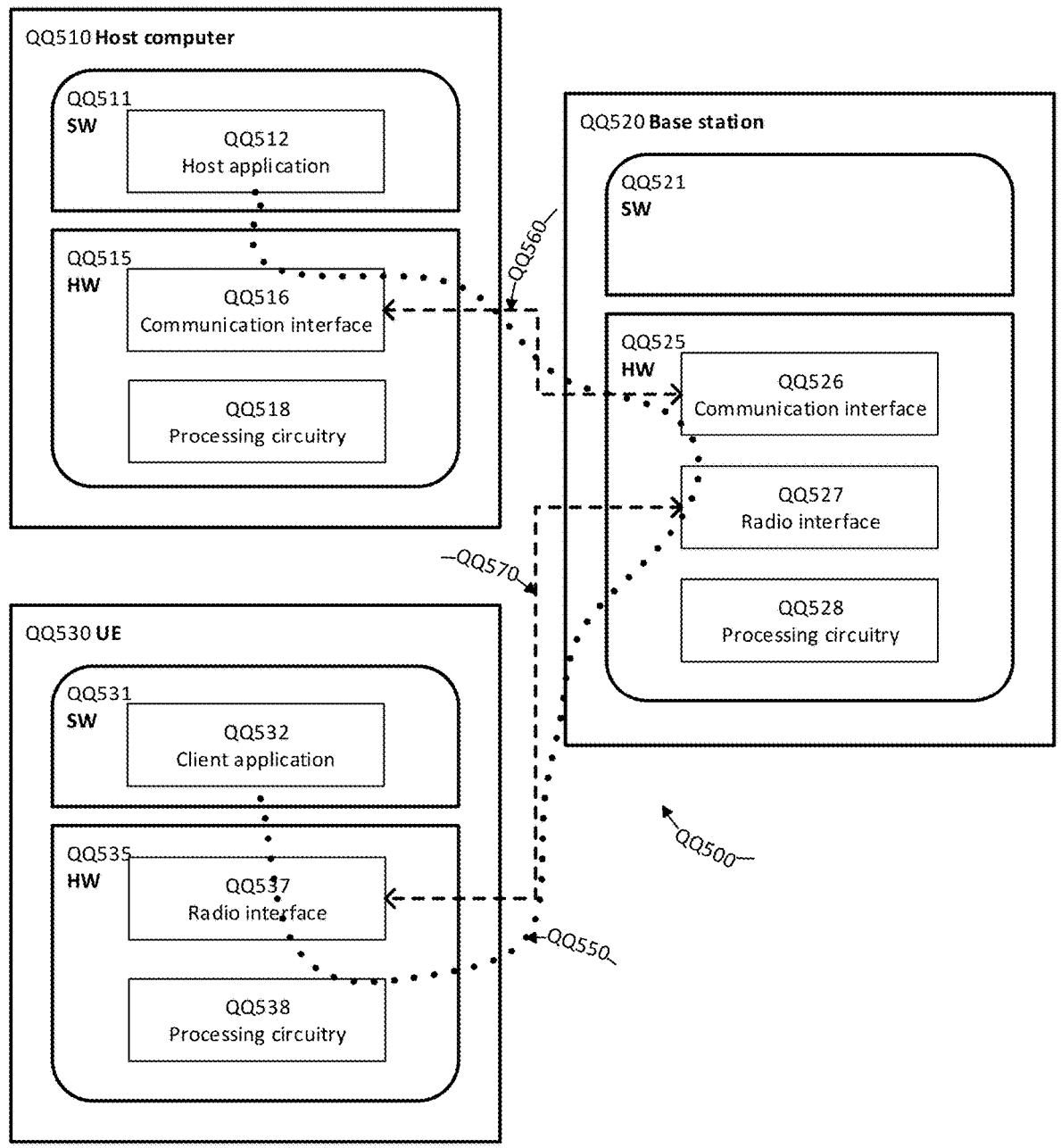
FIG. 24 is a schematic diagram illustrating an example of a host computer communicating via a base station with a user equipment over a partially wireless connection in accordance with some embodiments.

FIG. 24 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 24. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 24) served by base station QQ520. Communication interface QQ526 may be configured to facilitate connection QQ560 to host computer QQ510. Connection QQ560 may be direct or it may pass through a core network (not shown in FIG. 24) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 24 may be similar or identical to host computer QQ430, one of base stations QQ412a, QQ412b, QQ412c and one of UEs QQ491, QQ492 of FIG. 23, respectively. This is to say, the inner workings of these entities may be as shown in FIG. 24 and independently, the surrounding network topology may be that of FIG. 23.

In FIG. 24, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIGS. 25A-B are schematic flow diagrams illustrating examples of methods implemented in a communication system including, e.g. a host computer, and optionally also a base station and a user equipment in accordance with some embodiments.

FIG. 25A is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 25A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 25B is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 25B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 26A:
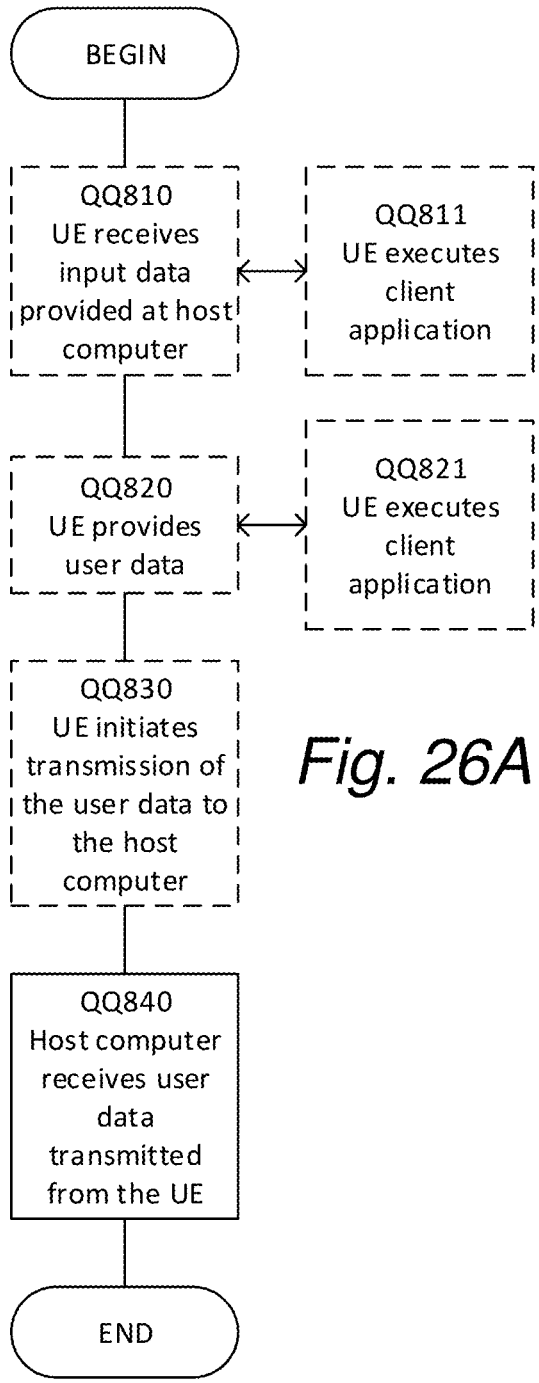
FIGS. 26A-B are schematic diagrams illustrating examples of methods implemented in a communication system including a host computer, a base station and a user equipment in accordance with some embodiments.
Figure 26B:
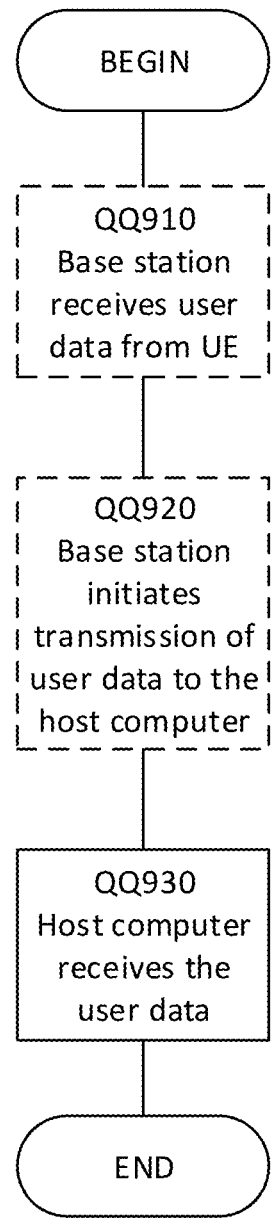

FIGS. 26A-B are schematic diagrams illustrating examples of methods implemented in a communication system including a host computer, a base station and a user equipment in accordance with some embodiments.

FIG. 26A is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 26A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 26B is a flowchart illustrating a method implemented in a communication system, in accordance with one embodiment. The communication system includes a host computer, a base station and a UE which may be those described with reference to FIG. 23 and FIG. 24. For simplicity of the present disclosure, only drawing references to FIG. 26B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In a complementary aspect, the proposed technology relates to a method, performed by a wireless device, further involving providing user data, and forwarding the user data to a host computer via the transmission to a network node.

In another complementary aspect, the proposed technology relates to a corresponding wireless device comprising processing circuitry configured to perform any of the steps of such a method.

In yet another complementary aspect, the proposed technology relates to a method, performed by a network node, further involving obtaining user data, and forwarding the user data to a host computer or a wireless device.

In still another complementary aspect, the proposed technology relates to a corresponding network node such as a base station comprising processing circuitry configured to perform any of the steps of such a method.

The proposed technology may also relate to a corresponding communication system including a host computer and/or a wireless device and/or a network node.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CoMP Coordinated Multi-Point
CP Cyclic Prefix
CPICH Common Pilot Channel
CQI Channel Quality information
C-RNTI Cell RNTI
CSI Channel State Information
CSI-RS Channel State Information Reference Signal
DC Dual Connectivity
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
mmW Millimeter Wave
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex TDOA Time Difference of Arrival
TOA Time of Arrival
TRP Transmission and Reception Point
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for performing radio resource management in a wireless communication system adapted to use directive beams for serving at least one user device, wherein the method comprises:
    obtaining image information from at least one image sensor monitoring at least part of a radio coverage area that is covered by a plurality of directive beams provided by at least one network node of the wireless communication system;
    processing the obtained image information to predict a change in radio propagation characteristics that affects one of the directive beams that serves a user device;
    based on the change in radio propagation characteristics predicted from the obtained image information, performing one or more of the following operations with respect to at least one of the directive beams selected based on the obtained image information:
        controlling transmission of mobility reference signals within the at least one directive beam;
        configuring the user device to perform measurements of mobility reference signals transmitted within the at least one directive beam; and
        configuring reporting and/or processing of measurements of mobility reference signals transmitted within the at least one directive beam.

2. The method of claim 1, wherein processing the obtained image information to predict a change in radio propagation characteristics comprises estimating relative movement between the user device and at least one obstacle in the radio coverage area and/or relative movement between the user device and the network node and predicting the change in radio propagation characteristics based on the estimated relative movement.

3. The method of claim 1, wherein controlling transmission of a mobility reference signal comprises at least one of: turning the mobility reference signal on and/or off; and configuring transmission of the mobility reference signal.

4. The method of claim 1, wherein configuring the user device to perform measurements of the mobility reference signal comprises configuring the measurements in at least one of frequency and time.

5. The method of claim 1, wherein configuring reporting and/or processing of measurements comprises configuring at least one of: reporting thresholds; measurement thresholds; and timers.

6. The method of claim 1, wherein the image information is obtained from multiple image sensors monitoring at least part of a radio coverage area of the wireless communication system.

7. The method of claim 6, wherein processing the obtained image information to predict a change in radio propagation characteristics comprises:
    dynamically producing an image-based geospatial model of the environment related to the radio coverage area or at least part thereof based on the image information obtained from the multiple image sensors;
    producing information related to radio resource management associated with the radio coverage area or at least part thereof; and
    processing information from the geospatial model of the environment and the information related to radio resource management to predict the change in radio propagation characteristics.

8. The method of claim 7, wherein the information related to radio resource management is produced as a layer of radio resource management related information on top of the geospatial model of the environment.

9. The method of claim 1, wherein performing the one or more operations, based on the predicted change in radio propagation characteristics, comprises generating control information, based on the predicted change in radio propagation characteristics, usable for performing the one or more operations.

10. The method of claim 9, further comprising transferring the generated control information to at least one of the network node and the user device.

11. The method of claim 1, wherein the at least one image sensors are:
    arranged in connection with at least one network node of the wireless communication system; and/or
    integrated with the at least one network node.

12. The method of claim 1, wherein the method is performed by a network unit associated with the wireless communication system.

13. A system for radio resource management in a wireless communication system adapted to use directive beams for serving at least one user device, the system for radio resource management comprising:
    at least one processor; and
    at least one memory storing computer-executable instructions that, when executed by the at least one processor, configure the system to:
        obtain image information from at least one image sensor monitoring at least part of a radio coverage area that is covered by a plurality of directive beams provided by at least one network node of the wireless communication system;
        process the obtained image information to predict a change in radio propagation characteristics that affects one of the directive beams that serves a user device;
        based on the change in radio propagation characteristics predicted from the obtained image information, perform one or more of the following operations with respect to at least one of the directive beams selected based on the obtained image information:
            control transmission of mobility reference signals within the at least one directive beam;
            configure the user device to perform measurements of mobility reference signals transmitted within the at least one directive beam; and
            configure reporting and/or processing of measurements of mobility reference signals transmitted within the at least one directive beam.

14. The system of claim 13, wherein execution of the instructions further configures the system to process the obtained image information to predict a change in radio propagation characteristics based on estimating relative movement between the user device and at least one obstacle in the radio coverage area and/or relative movement between the user device and the network node and predicting the change in radio propagation characteristics based on the estimated relative movement.

15. The system of claim 13, wherein execution of the instructions further configures the system to control transmission of a mobility reference signal by at least one of: turning the mobility reference signal on and/or off; and configuring transmission of the mobility reference signal.

16. The system of any claim 13, wherein execution of the instructions further configures the system to configure the user device to perform measurements of the mobility reference signal in at least one of frequency and time.

17. The system of claim 13, wherein execution of the instructions further configures the system to configure reporting and/or processing of measurements by configuring at least one of: reporting thresholds; measurement thresholds; and timers.

18. The system of claim 13, wherein execution of the instructions further configures the system to obtain the image information from multiple image sensors monitoring at least part of a radio coverage area of the wireless communication system.

19. The system of claim 18, wherein execution of the instructions further configures the system to:
dynamically produce an image-based geospatial model of the environment related to the radio coverage area or at least part thereof based on the image information obtained from the multiple image sensors;
produce information related to radio resource management associated with the radio coverage area or at least part thereof; and
process information from the geospatial model of the environment and the information related to radio resource management to predict the change in radio propagation characteristics.

20. The system of claim 19, wherein execution of the instructions further configures the system to produce the information related to radio resource management as a layer of radio resource management related information on top of the geospatial model of the environment.

21. The system of claim 13, wherein execution of the instructions further configures the system generate, based on the predicted change in radio propagation characteristics, control information usable for performing the one or more operations.

22. The system of claim 21, wherein execution of the instructions further configures the system to transfer the generated control information to at least one of the network node and the user device.

23. The system of claim 13, wherein the at least one image sensors are:
arranged in connection with at least one network node of the wireless communication system; and/or
integrated with the at least one network node.

24. A network unit comprising a system for radio resource management according to claim 13.

25. The network unit of claim 24, wherein the network unit is one of a radio access network node and a cloud-based network device.

26. A radio resource management controller for a wireless communication system adapted to use directive beams for serving at least one user device, the controller comprising:
at least one processor; and
at least one memory storing computer-executable instructions that, when executed by the at least one processor, configure the controller to perform, based on image information obtained from at least one image sensor monitoring at least part of a radio coverage area that is covered by a plurality of directive beams provided by at least one network node of the wireless communication system, at least one of the following operations with respect to at least one of the directive beams selected based on the obtained image information:
control transmission of mobility reference signals within the at least one directive beam;
configure a user device to perform measurements of mobility reference signals transmitted within the at least one directive beam; and
configure reporting and/or processing of measurements of mobility reference signals transmitted within the at least one directive beam.

27. A network unit comprising a radio resource management controller of claim 26.

28. A non-transitory, computer-readable medium storing computer-executable instructions that, when executed by at least one processor comprising a wireless communication system adapted to use directive beams for serving at least one user device, configures the at least one processor to:
obtain image information from at least one image sensor monitoring at least part of a radio coverage area that is covered by a plurality of directive beams provided by at least one network node of the wireless communication system;
process the obtained image information to predict a change in radio propagation characteristics that affects one of the directive beams that serves a user device;
based on the change in radio propagation characteristics predicted from the obtained image information, generate control information usable for performing one or more of the following operations with respect to at least one of the directive beams selected based on the obtained image information:
controlling transmission of mobility reference signals within the at least one directive beam;
configuring the user device to perform measurements of mobility reference signals transmitted within the at least one directive beam; and
configuring reporting and/or processing of measurements of mobility reference signals transmitted within the at least one directive beam.

* * * * *